United States Patent [19]

Blasciak

[11] Patent Number: 5,103,394
[45] Date of Patent: Apr. 7, 1992

[54] SOFTWARE PERFORMANCE ANALYZER

[75] Inventor: Andrew J. Blasciak, Colorado Springs, Colo.

[73] Assignee: Hewlett-Packard Company, Palo Alto, Calif.

[21] Appl. No.: 455,805

[22] Filed: Dec. 21, 1989

Related U.S. Application Data

[60] Continuation of Ser. No. 325,753, Mar. 20, 1988, abandoned, which is a division of Ser. No. 106,947, Oct. 14, 1987, Pat. No. 4,845,615, which is a continuation of Ser. No. 605,515, Apr. 30, 1984, abandoned.

[51] Int. Cl.$^5$ ............................................. G06F 11/34
[52] U.S. Cl. .................................... 395/575; 364/264; 364/264.4; 364/265.6; 364/267; 364/267.1; 364/267.3; 364/267.4; 364/DIG. 1
[58] Field of Search .................... 364/200, 900; 371/19

[56] References Cited

U.S. PATENT DOCUMENTS

| | | | |
|---|---|---|---|
| 4,080,650 | 3/1978 | Beckett | 364/200 |
| 4,231,106 | 10/1980 | Heap et al. | 364/900 |
| 4,321,666 | 3/1982 | Tasar et al. | 364/200 |
| 4,338,660 | 7/1982 | Kelley et al. | 364/200 |
| 4,382,179 | 5/1983 | Penton | 364/200 X |
| 4,486,827 | 12/1984 | Shima et al. | 364/200 |
| 4,511,961 | 4/1985 | Penton | 364/200 |
| 4,845,615 | 7/1989 | Blasciak | 364/200 |

*Primary Examiner*—Eddie P. Chan
*Assistant Examiner*—P. V. Kulik
*Attorney, Agent, or Firm*—Edward L. Miller

[57] ABSTRACT

A software performance analyzer nonintrusively measures six different aspects of software execution. These include histograms or a table indicating the degree of memory activity within a collection of specified address ranges, or indicating the amount of memory or bus activity caused by the execution of programming fetched from within a collection of specified ranges, or indicating for a specified program the relative frequency with which it actually executes in specified lengths of time, or indicating for a specified program the relative frequency of a collection of specified available potential execution times (i.e., the complement of the previous measurement), or indicating for two specified programs the relative frequency of a specified collection time intervals between the end of one of the programs and the start of the other, or lastly, indicating the number of transitions between selected pair of programs. All measurements may be either percentages relative to only the specified programs or ranges, or may be absolute percentages with respect to all activity occurring during the measurement. Acquired data may be in terms of time or of qualified occurrences of a specified event. Enable/disable and windowing for context recognition are available. The measurements are made by randomly choosing and monitoring a first range for a selected period of time. An address range detector and bus status recognize supply information to a state machine configured to control the particular type of measurement desired. Various counters are responsive to the state machine and accumulate data later reduced by software controlling the software performance analyzer. At the end of the monitoring period the next address range is monitored, and so on until the entire list has been used, whereupon a new random starting range is chosen and the measurement continues. The first two types of measurements listed above may also be performed in a real-time mode where two ranges are in fact monitored simultaneously and nearly continuously.

3 Claims, 16 Drawing Sheets

ANY DURATION OR USAGE MEASUREMENT

FIG 2B

| MEMORY ACTIVITY | | OCCURRENCE | RELATIVE | Confidence Level: 95%<br>Error Tolerance: 3% | |
|---|---|---|---|---|---|
| EVENT | COUNT | ABS COUNT | PERCENT | MEAN | STD DEV |
| FILE_BUFF_1 | 519,493 | 3,228,676 | 25 | 28,860.7 | 1,399.6 |
| FILE_BUFF_2 | 425,694 | 3,228,682 | 21 | 23,649.7 | 1,571.4 |
| FILE_BUFF_3 | 315,805 | 3,228,663 | 15 | 17,544.7 | 1,368.4 |
| FILE_BUFF_4 | 468,169 | 3,228,670 | 23 | 26,009.4 | 1,333.7 |
| FILE_BUFF_5 | 210,632 | 3,228,672 | 10 | 11,701.8 | 1,052.6 |
| FILE_BUFF_6 | 102,117 | 3,228,673 | 5 | 5,673.2 | 166.17 |
| FILE_BUFF_7 | 25,812 | 3,228,666 | 1 | 1,434.0 | 0.00 |
| FILE_BUFF_8 | 0 | 3,228,654 | 0 | 0.00 | 0.00 |
| TOTAL COUNT: | 2,067,722 | | | | |

STATUS: Termination condition found - measurement complete          16:37 define    setup    measure    copy    configure    show    execute    end

|  | Trace List | | State 6,120 channel, 8085 interface | | |
|---|---|---|---|---|---|
| Label:<br>Base:<br>Map: | ADDRESS<br>hex<br>ADDR MAP | 8085 Mnemonic<br>hex<br>ADDR MAP | | STATUS<br>hex<br>STAT MAP | time count<br>rel |
| trigger | TEST+0000 | XRA A | | Opcode | 1.48 usec |
| +001 | TEST+0001 | OUT 28 | | Opcode | 2.00 usec |
| +002 ** | TEST+0002 | 28 memory read | | Mem_read | 2.00 usec |
| +003 | abs 2828 | 00 i/o write | | Io_write | 1.52 usec |
| +004 * | TEST+0003 | MOV A,M | | Opcode | 1.48 usec |
| +005 * | abs 0BFD | 88 memory read | | Mem_read | 2.00 usec |
| +006 | TEST+0004 | OUT 38 | | Opcode | 1.52 usec |
| +007 ** | TEST+0005 | 38 memory read | | Mem_read | 2.00 usec |
| +008 | abs 3838 | 88 i/o write | | Io_write | 1.48 usec |
| +009 | TEST+0006 | MOV A,B | | Opcode | 1.52 usec |
| +010 | TEST+0007 | OUT 28 | | Opcode | 2.00 usec |
| +011 * | TEST+0008 | 28 memory read | | Mem_read | 2.00 usec |
| +012 | abs 2828 | 08 i/o write | | Io_write | 1.48 usec |
| +013 | TEST+0009 | RET | | Opcode | 1.52 usec |

STATUS: Awaiting state command - userid TEST1     11:34 display <LINE #> ___ disasmb ___ show ___ execute ___ ---ETC---

FIG 4

SOFTWARE PERFORMANCE ANALYZER

REFERENCE TO RELATED APPLICATION

This application is a continuation Ser. No. 07/325,753 filed Mar. 20, 1989 and which is now abandoned, and which in turn was a division of Ser. No. 07/106,947 filed Oct. 14, 1987 and which has since issued as U.S. Pat. No. 4,845,615, and which in turn was a continuation of Ser. No. 06/604,415 on Apr. 30, 1984 and which is now abandoned.

BACKGROUND AND SUMMARY OF THE INVENTION

An increasing number of products are incorporating microprocessors. Much of the development cost of these products is related to the testing and debugging of the programs executed by the microprocessor. Also, the performance of the resulting product may depend heavily upon the various design choices made and the skill employed in writing those programs. That programming may be in the form of firmware or software; as far as the description below is concerned the difference is moot, and such programming will hereinafter be referred to simply as software.

Any new product that relies heavily on software to accomplish its intended function goes through a development cycle during which designers depend on a variety of measurement tools (e.g., emulators, timing analyzers, logic state analyzers and the like) to test, debug, and analyze the product's performance. The instant invention is an additional measurement tool that aids designers in nearly every phase of the software development cycle. It can be used for software characterization, testing, debugging, and optimization, and can characterize software nonintrusively as that software executes in real time.

Traditionally, program performance has been measured in one of two ways: through in-program "hooks," which print out a short message every time the block of code in which they reside is executed, or by custom designed monitoring programs, which oversee the execution of the target code and measure the duration of execution. The main drawback of both traditional methods is that they are intrusive and affect real-time operation. In-program hooks lengthen the program under test and must be removed if the finished code is to fit in a restricted memory space. Once removed, however, they are no longer available to monitor code execution. Therefore, for every debugging effort the hooks must be regenerated; a difficult and costly task. Similarly, program monitors, whether they be line-by-line tracers or event timers, add their own execution time to that of the program. As a consequence, they are not well suited to situations that require real detective work across a wide spectrum of module interaction. A further disadvantage of these traditional methods is that they must be specifically tailored to each measurement to be performed, a time consuming and possibly error prone programming task in itself.

In contrast, the software performance analyzer disclosed herein can perform six separate nonintrusive measurements: program activity, memory activity, module duration, module usage, intermodule duration, and intermodule linkage. Each measurement permits different insights into software performance. Data is collected, analyzed, and updated continuously, providing a sizable data base for statistical analysis. Measurement results, displayed in either histogram or tabular format, can be used by the analyzer for statistical analysis of data.

Data collection parameters are entered quickly and easily with directed-syntax softkeys. Symbols and labels generated in program assembly or compilation can be used directly in defining measurements. Measurement configurations are flexible, meeting a variety of application requirements. The software performance analyzer can be specified to provide, for example, a global view of the entire memory space divided into 12 address ranges, or more detailed analysis, as in showing how frequently a subroutine is called by another subroutine. Measurements may be initiated and terminated manually, or automatically by setting enable/disable conditions. Alternatively, windows can be defined for repetitive data collecion in a defined code segment for situations requiring context recognition.

These and other aspects of the invention are achieved by identifying the address boundaries of each module or portion of memory that is of interest to an activity measurement, and creating in a RAM a list of those ranges thus defined. A microprocessor randomly selects a starting point in the list and configures a programmable range detector to represent the selected range. Address information from the target system under test is applied to the range detector, whose output is applied to a state machine. The state machine also receives target system status information. The rules embodied by the state machine are measurement dependent, and are selected under the control of the microprocessor. The state machine responds to sequences of events in the target system under test by producing various control signals applied to some reconfigurable counter circuitry. The configuration of the counter circuitry is also responsive to the microprocessor. The counts accumulated by the configured counters are captured after a preselected amount of time (or perhaps a preselected number of occurrences of a predefined event on the bus of the target system) and are incorporated into the overall measurement results. The next range in the list is then applied to the range detector and the process continues until the entire list has been used. The list is reused with another randomly chosen range as the starting point, and so on, until the measurement is complete.

Duration and usage measurements are similar, except that only one module or the interim between two modules is specified. Associated with either are simply a start address and a stop address. A list of possible time ranges is specified. In these measurements the range detector is loaded with the range whose boundaries are the start and stop addresses. The counters are configured to acquire the number of times the associated time interval falls within a randomly selected element of the list of time ranges. After a preselect amount of time the counters are reconfigured to represent the next time range in the list. After each such change the acquired data is incorporated into the overall measurement, and the process continues until the complete list has been used. The list is re-used, with another randomly chosen starting point, and so on, until the measurement is completed.

The intermodule linkage measurement is made in a similar fashion. The state machine is equipped with a suitable rule of operation for exerting the counter control lines and the counters configured in a correspondingly suitable manner.

BRIEF DESCRIPTION OF THE DRAWINGS

FIGS. 2A-B are illustrations of histogram and tabular presentations of the memory activity measurement of the invention.

FIG. 4 is a logic state analyzer trace annotated to show the conceptual difference between the memory activity and program activity measurements.

DESCRIPTION OF THE PREFERRED EMBODIMENT

Figure 1:
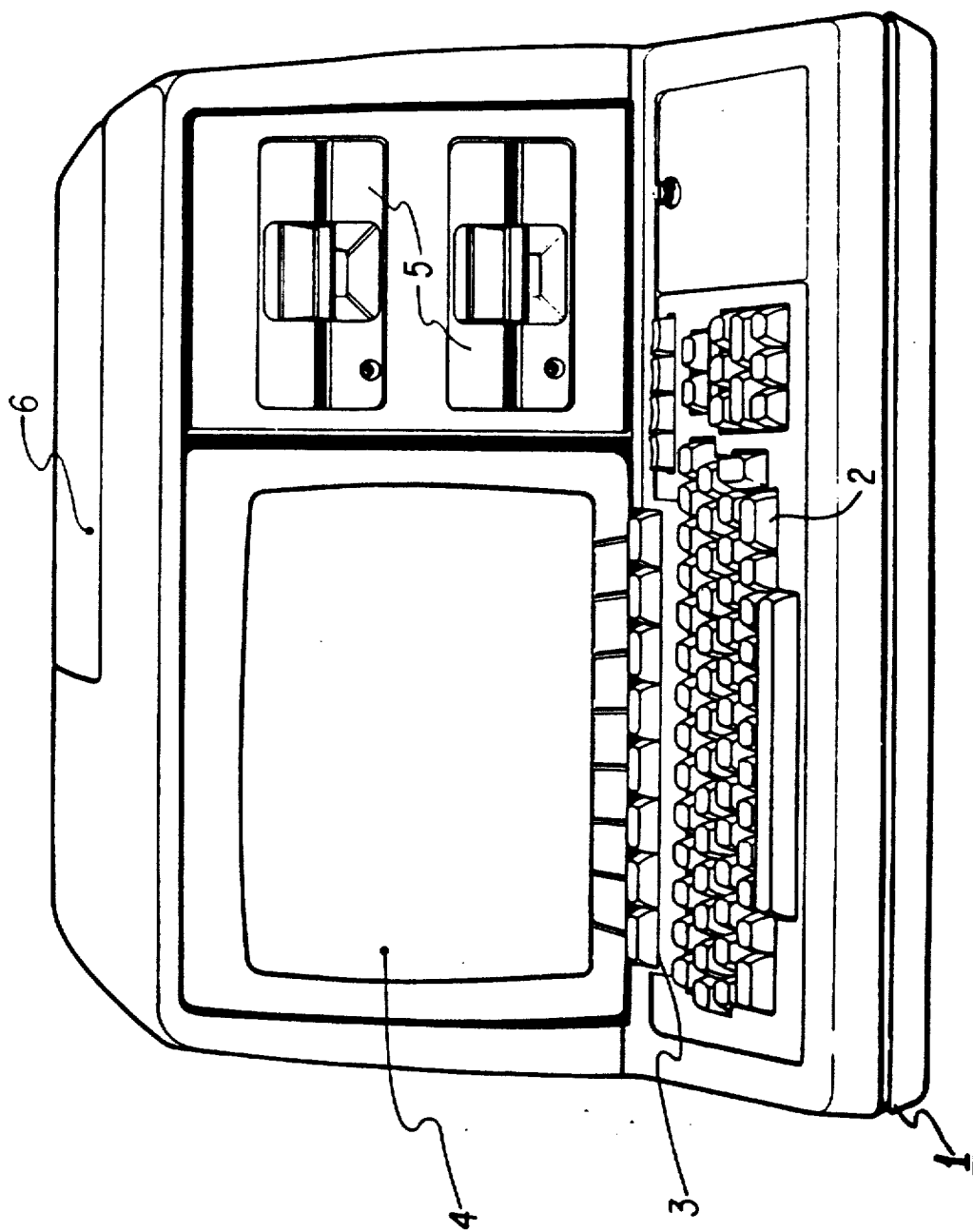
FIG. 1 is a front perspective view of a certain microprocessor development system which is one instance of a host system capable of using the invention when the latter is configured as a plug-in option.

FIG. 1 is an illustration of one apparatus 1 to which the invention is applicable. The apparatus 1 of FIG. 1 is a "microprocessor development system" that includes a keyboard 2 with a row of re-definable "soft keys" 3 adjacent a CRT display 4. The apparatus 1 also includes a mass storage facility 5 (a dual disc drive in this instance) and is capable of receiving an extensive collection of options. Each option has one or more printed circuit boards that are installable under a hatch 6 in the apparatus cover, and generally also has some associated software which augments an operating and measurement system already resident in apparatus 1.

Among the options that may be installed in the apparatus 1 are emulators, logic state analyzers, timing analyzers, and the subject of the instant disclosure, a software performance analyzer. It will, of course, be understood by those skilled in the art that the invention need not be produced as an option to some other apparatus, but may equally well be implemented as a complete stand-alone measurement device, if desired. Nevertheless, since the invention was first produced as such an option, it will, as a matter of convenience, be described in that form.

In the present embodiment the software performance analyzer consists of a single p.c. board and some accompanying software that are each installed in the microprocessor development system. In one particular actual embodiment where the apparatus 1 is a Hewlett-Packard model 64000 an emulator option must also be installed. In that case the connections for the plug-in p.c. boards are arranged so that the necessary signals from the target system under test are automatically coupled to the software performance analyzer as the target software is executed with the emulator.

It would, of course, be equally possible to equip the software performance analyzer with its own probes as well as signal acquisition and conditioning circuitry, so that it could be attached directly to an arbitrary processor executing the target software. While that would have certain advantages pertaining to flexibility, the scheme of automatic coupling to an emulator has the equally attractive advantage of allowing software performance analysis to proceed even before the hardware of the target system is complete.

Once the software performance analyzer is installed and accessed various re-definable definitions appear at the bottom of the CRT display 4. These definitions are associated with the row of re-definable soft keys 3. With the aid of these keys the user instructs the apparatus 1 and its various options (including the software performance analyzer in particular) concerning the measurements that are desired. This is accomplished via an interactive process involving "directed syntax," wherein the operating and measurement system dynamically varies the definitions of the soft keys 3 as the user proceeds through the syntax of each command. In this way the user is continually presented with only valid choices, and is automatically instructed and guided in his selection of parameters for the various commands. In response to his commands the operating and measurement system writes various control values into registers in the option p.c. boards and elsewhere. That configures those elements of hardware to operate in the modes selected and to perform the desired measurements. It is to those measurements made possible by the software performance analyzer option to which we now turn.

Memory Activity Measurements

Memory activity measurements indicate either the number of memory cycles directed to one or more selected portions of memory or the amount of time spent performing those memory cycles. In the present embodiment as many as twelve portions of memory may be defined using address ranges, single address values, module names, or program symbols. Data collection may be qualified further by including only specified bus activity. This qualification may include, singly or in combination, memory reads, memory writes, stack operations, opcode fetches, I/O or DMA activities, or other bus activity involving an address, depending upon the various status indications available from the particular processor being monitored.

Figure 2A:
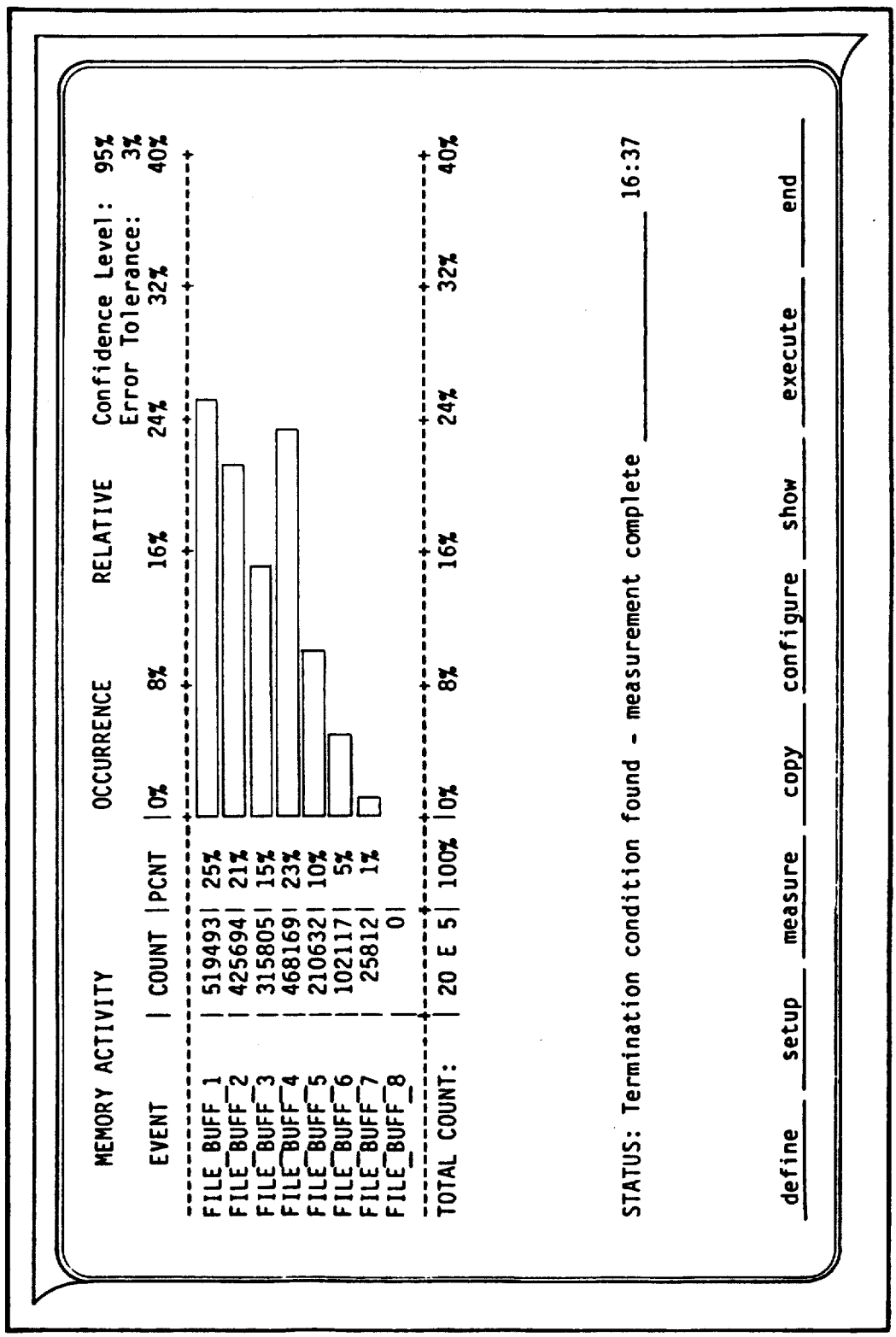

Referring to FIGS. 2A and 2B, memory activity measurements can be displayed in a variety of formats. The measurement can be displayed in terms of activity count or elapsed time and may be displayed in tabular as well as histogram form. Additionally, displays may indicate activity either as percentages relative to only the events being monitored or as absolute percentages of total system memory activity. Information from memory activity measurements gives the user a basis for allocating available memory more efficiently. Such a measurement can point to areas where memory allocation may be too large, or too small, and is also valuable in optimizing algorithms.

Program Activity Measurements

The program activity measurement determines for one or more selectable blocks of program memory either how much time is being spent executing those blocks or how much "activity" is generated by those blocks. "Activity" is measured by respectively accumulating the number of target system bus cycles occurring as the processor executes the code in each block. Such bus cycles are a good indicator of anything that amounts to a separate action that uses a resource, and include read and write operations to memory as well as pops and pushes on a stack. A sequencing algorithm is employed to select for inclusion in the measurement only those bus cycles that are legitimately pursuant to an instruction fetch from within the module currently under consideration.

Figure 3:
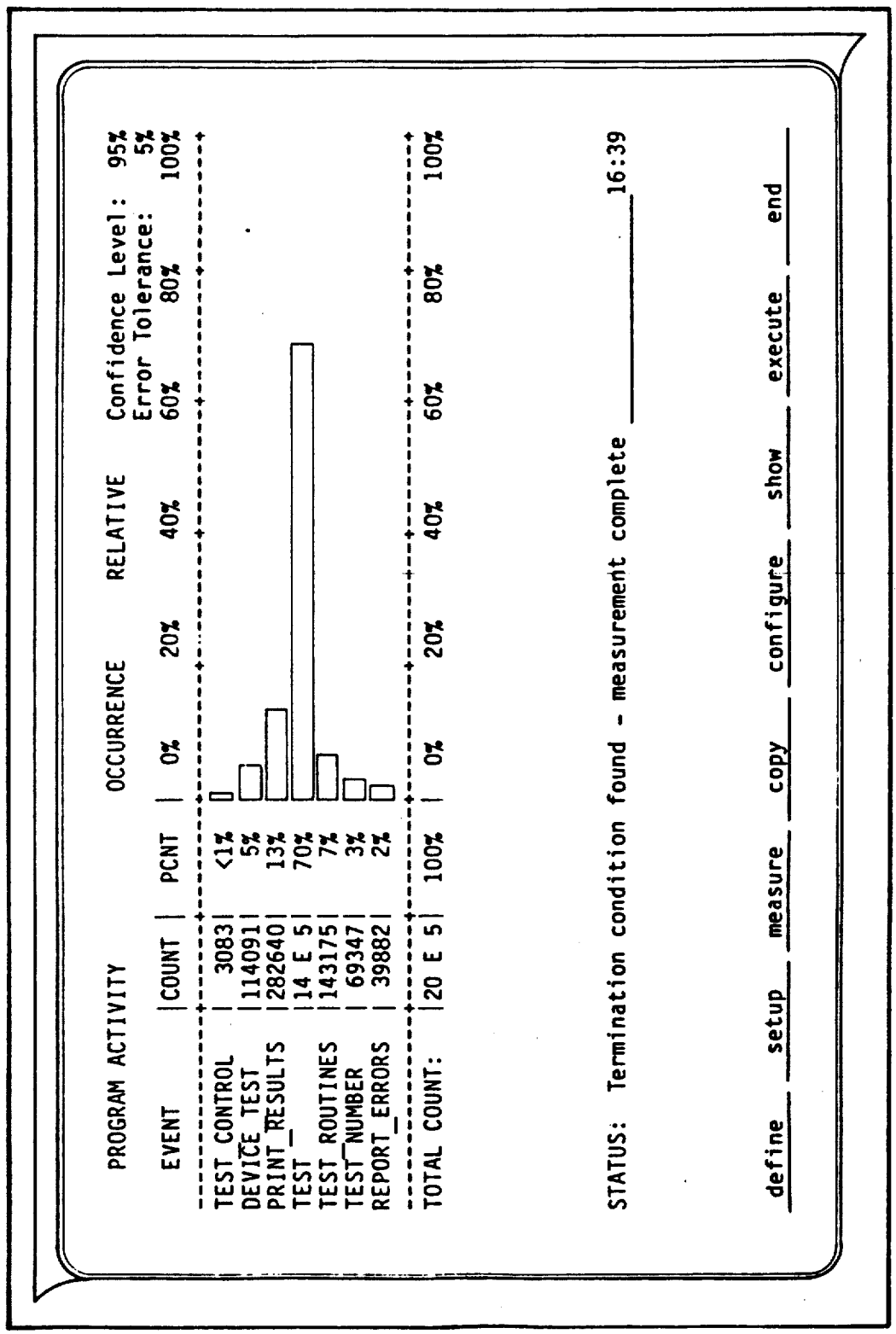
FIG. 3 is an illustration of the histogram presentation of the program activity measurement of the invention.

Program activity measurements can be displayed upon the CRT 4 in a variety of formats, one of which is illustrated in FIG. 3. The results can be displayed in terms of activity count or elapsed time, and may be displayed in tabular as well as histogram form. Also, the results may be indicated as activity percentages relative to only the events being monitored, or as absolute percentages of the overall program activity of the system under test.

FIG. 4 illustrates the difference between a program activity measurement and a memory activity measurement. The figure is an annotated trace list of a module named TEST, and was produced by a conventional logic state analyzer. A program activity measurement of the module TEST would acquire information corresponding to the entire trace of FIG. 4. A memory activity measurement of TEST, with status qualification set to record only opcode fetches, would include only those portions of the trace annotated by the asterisks.

Using either time or occurrence in a program activity measurement, the user can quickly locate potential problem areas, such as a buffer overflow routine that is experiencing exceptionally high activity levels or, a program module that is consuming an inordinate amount of execution time, based on performance parameters established during the design phase. Since the program activity measurement monitors all activity generated by a module, the user can quickly isolate modules that cause large amounts of activity nested deep within a program. These modules, then, are the principal targets for the most beneficial optimization efforts. Insights gained from such a general overview obtained by a program activity measurement will likely suggest a closer look at a module with some of the software performance analyzer's other measurements.

Use of Symbolic Definitions

When making a measurement the performance analyzer may be instructed to monitor either individual addresses or selectable arbitrary ranges of addresses in the program memory. An individual address might contain a single machine instruction, and a range of addresses might contain a compiled or assembled subroutine, function, module or data table. Each such individual address or range of addresses is referred to as an "address event" and may be defined either literally (e.g., by an explicit hexadecimal address) or symbolicly by a name assigned to the associated piece of programming. If the name is ad hoc (does not appear in the source programming) then the user must define it to the performance analyzer. However, the analyzer automatically searches the various files at its disposal resulting from the compilation or assembly of the source programming. If it finds the name it then determines for itself the corresponding absolute addresses, and no further definition is required. For a detailed example of how this process is carried out for a related but different analyzer, see U.S. Patent application Ser. No. 481,010 filed Mar. 31, 1983 by Bryce Goodwin. That application is entitled LOGIC ANALYZER USING SOURCE PROGRAM OR OTHER USER DEFINED SYMBOLS IN THE TRACE SPECIFICATION AND THE TRACE LISTING, and is assigned to Hewlett-Packard Company, as is the present application.

Module Duration Measurement

The module duration measurement generates a time distribution histogram representing execution times of a specified module or block of code. Time distribution measurements allow characterization and verification of best-case and worst-case execution times. By discovering modules consuming inordinate amounts of processing time the sources of overall system degradation are identified. Spurious execution times, as a result of passing faulty parameters or improper algorithms for example, become highly visible in this measurement.

The data gathered by a module duration measurement are characterized in terms of "time events." These events represent time ranges with minimum lower limits of 1 us (depending upon the bus cycle speed of the processor being monitored) to maximum upper limits of over 11 minutes. Initial module duration measurements often span a relatively large total time interval. As the investigation proceeds, it is possible to focus on specific time events by using smaller time ranges defined more closely around pertinent time values. The resulting "magnification" of data provides better measurement resolution.

The module duration measurement incorporates an "exclude calls" feature. Suppose the module being measured makes calls to other modules or subroutines. If the exclude calls feature is not invoked, such transfers of control out of and then back into the module contribute to the time events associated with the duration measurement of the module. If the exclude calls feature is invoked the amounts of time spent pursuant to any such calls do not contribute to the various time events obtained during the course of the measurement.

In interrupt-driven systems various module timing measurements are often difficult to interpret depending on the regularity and frequency of interrupts and their associated service routines. Under these conditions, it is useful to be able to either include or exclude interrupt caused activity external to the module of interest. The call exclusion feature allows the user to consider the time spent in the execution of interrupt-activated code as well as time spent in subroutines or functions referenced by the module. Subsequent measurements of module duration excluding, then including such activity, allows the user to gain a more complete understanding of external procedures, functions, interrupts, etc., and their effect on system activity at the module level.

Figure 5:
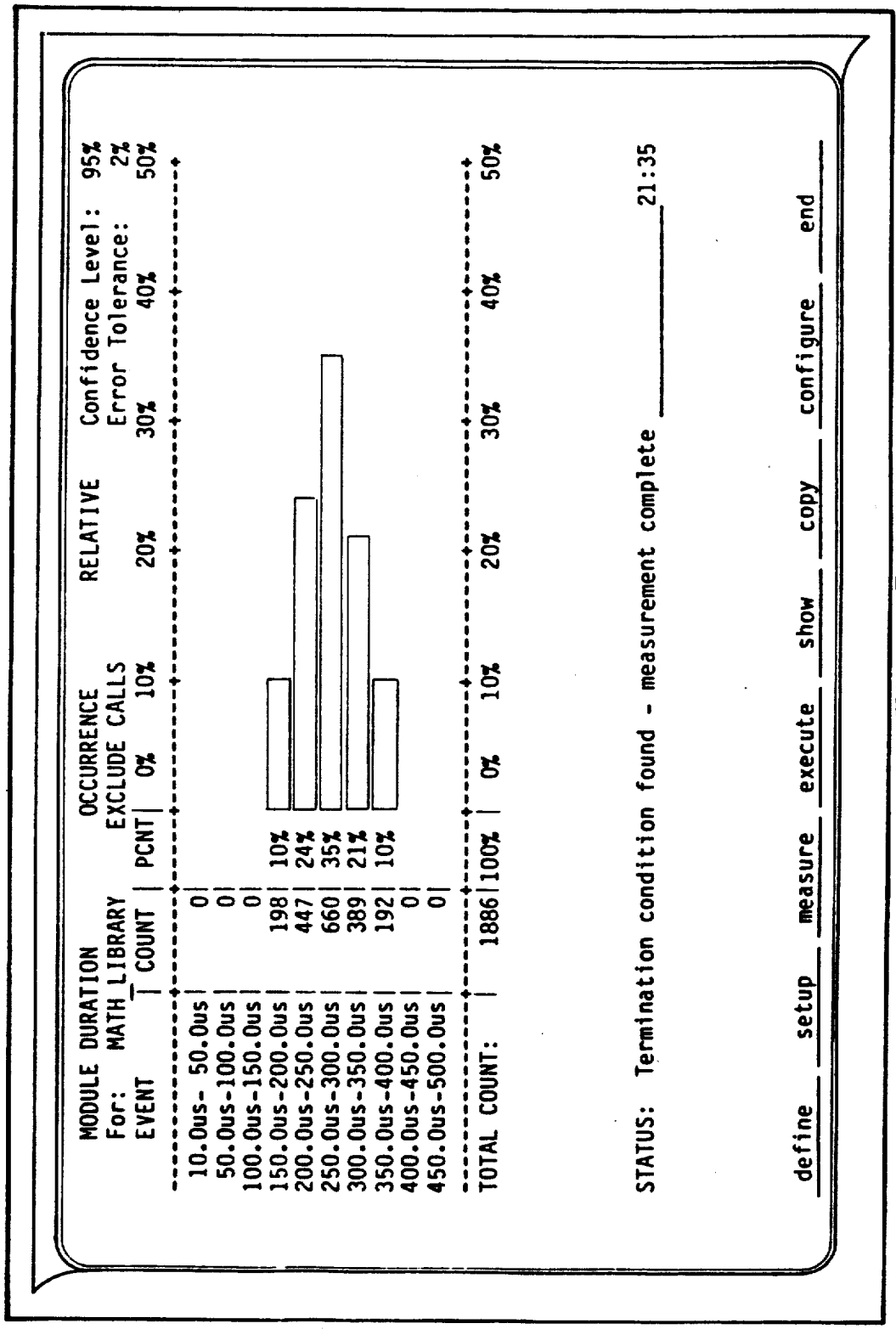
FIG. 5 is an illustration of the histogram presentation of the module duration measurement of the invention.

FIG. 5 illustrates a relative histogram display of a module duration measurement. As before, the results can be presented in either relative or absolute form, and as either a table or a histogram.

Module Usage Measurement

The module usage measurement provides a distribution of the time available for execution of other tasks after a specific module executes. It indicates the intensity of demand for the services of a module. This results in an extremely useful measurement for identifying program areas where optimization efforts can be most effective.

Figure 6:
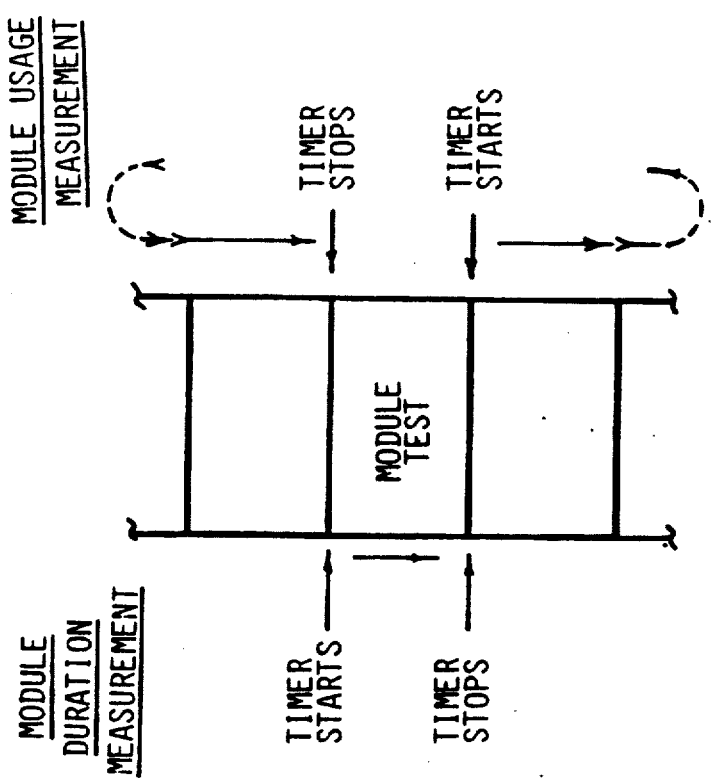
FIG. 6 is an idealized flow diagram illustrating the difference between the module duration and module usage measurements.

The module usage measurement is the complement of the module duration measurement, in that it records as time events the time from a module completion to the time that same module is used again. FIG. 6 contrasts the two measurements.

In a typical application, the module usage measurement may reflect low demand for a specific module, allowing other scheduled tasks to occur normally. A small percentage of the time, the measurement may indicate heavy module usage, preventing other system tasks from being performed at all. This usage measurement is a valuable pointer to task scheduling problems, indicating the need for operating system level modifications and task optimization. Program modifications can then produce more effective and efficient task scheduling, resulting in greater overall system throughput.

Figure 7:
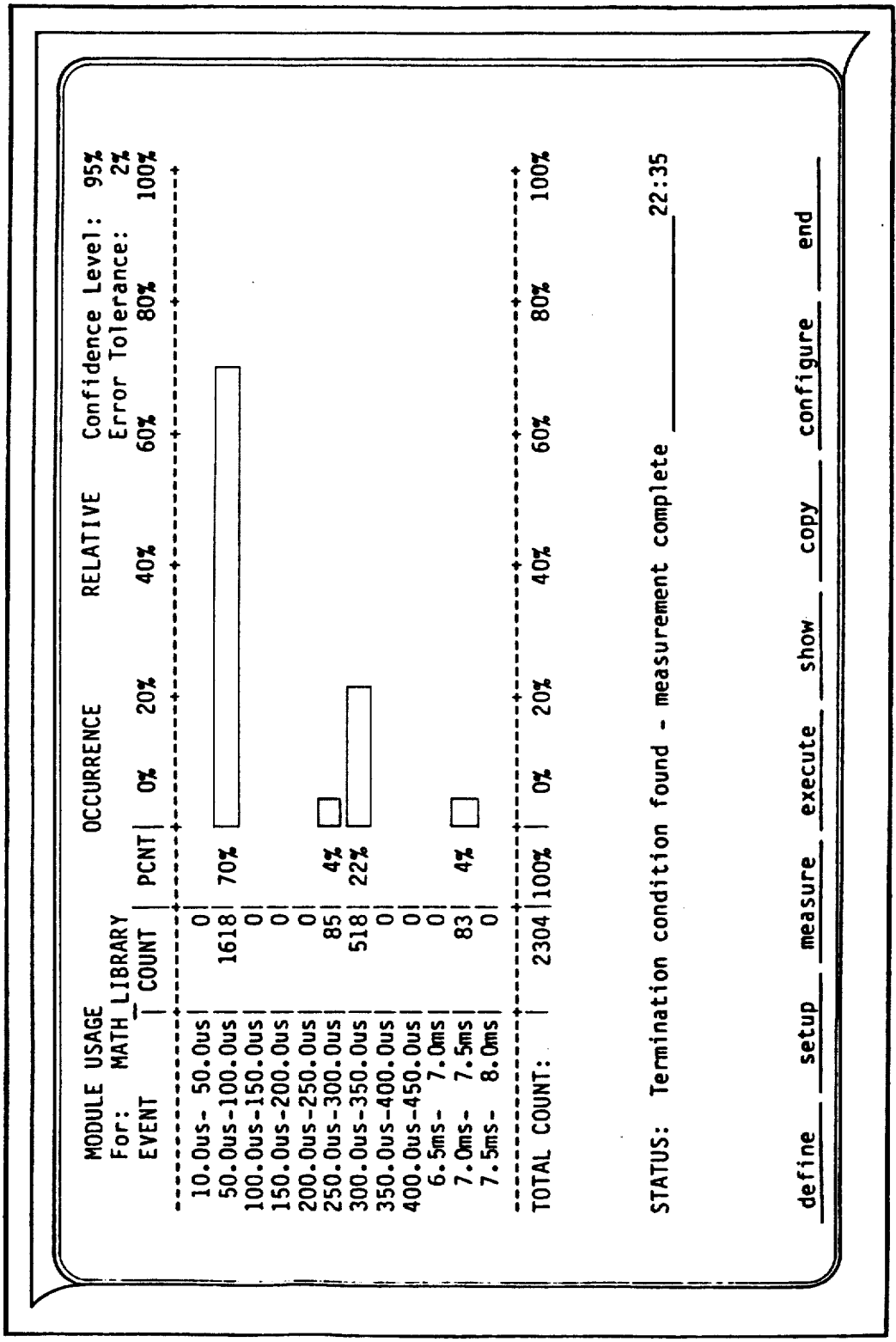
FIG. 7 is an illustration of the histogram presentation of the module usage measurement of the invention.

Up to twelve time ranges from 1 us (depending on the processor being monitored) to 11.18 minutes may be specified. The results may be displayed in any of the types of formats previously mentioned. FIG. 7 is an illustration of one such result.

Intermodule Duration Measurement

Figure 8:
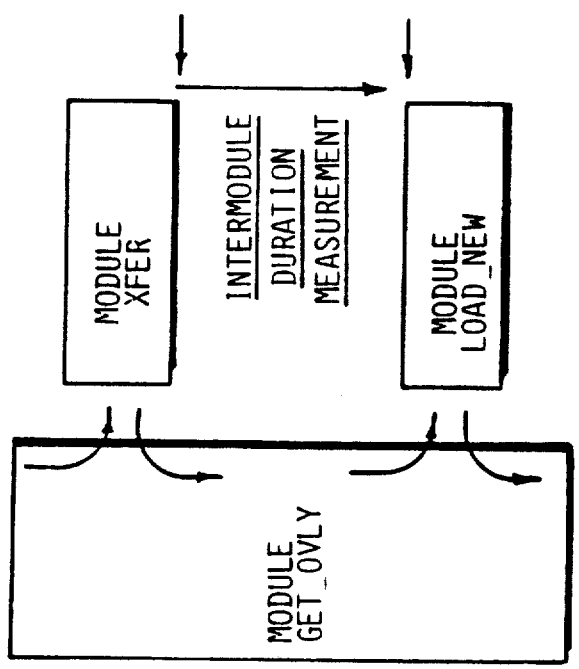
FIG. 8 is an idealized flow diagram illustrating the nature of the intermodule duration measurement of the invention.

The intermodule duration measurement produces a distribution of the time intervals between successive executions of two specified modules. Referring to FIG. 8, the time duration is measured between execution of the last instruction of the "from" module and the first instruction of the "to" module.

Here, as in other duration measurements, up to twelve time events (ranges) may be specified. Each range may be from 1 us to 11.18 minutes. The lower limit of 1 us is dependent upon the bus cycle rate of the processor being monitored. The results may be displayed in any of the formats previously described.

Intermodule duration measurements can provide a strong basis for resolving module interaction problems. Transfer timing between modules is often critical, especially when software is interacting with other software or external hardware. Overall system performance can be markedly improved by first identifying worst-case program paths, and then optimizing the interaction involved.

Intermodule Linkage Measurement

The intermodule linkage measurement provides direct visibility of module-to-module transfers for the analysis of program flow paths versus path usage intensity.

Up to six module pairs may be specified for measurement in a "from module/to module" form. The linkage measurement indicates the number of direct program transfers from a specified module to another selected module as a percentage of any transfers whatsoever from the "from module(s)" specified or as a percentage of only those transfers between the module pairs specified.

Figure 9:
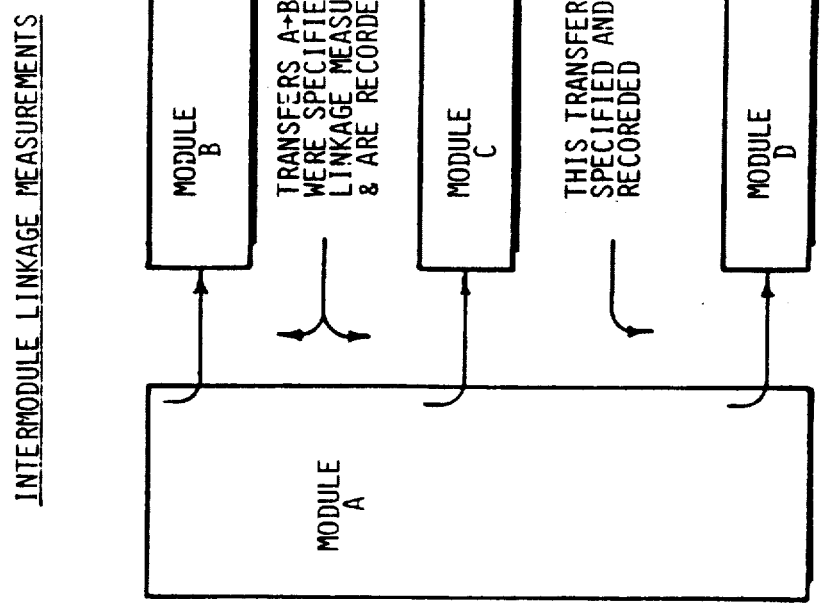
FIG. 9 is an idealized flow diagram illustrating the nature of the intermodule linkage measurement of the invention.

The intermodule linkage measurement diagrammed in FIG. 9 displays A to B transfers and A to C transfers as a percentage of only those transfers from A to B or A to C. Alternatively, the measurement could show A to B and A to C transfers as a percentage of all transfers from A. This is especially helpful in spotting unexpected transfer conditions that should not be occurring.

Figure 10:
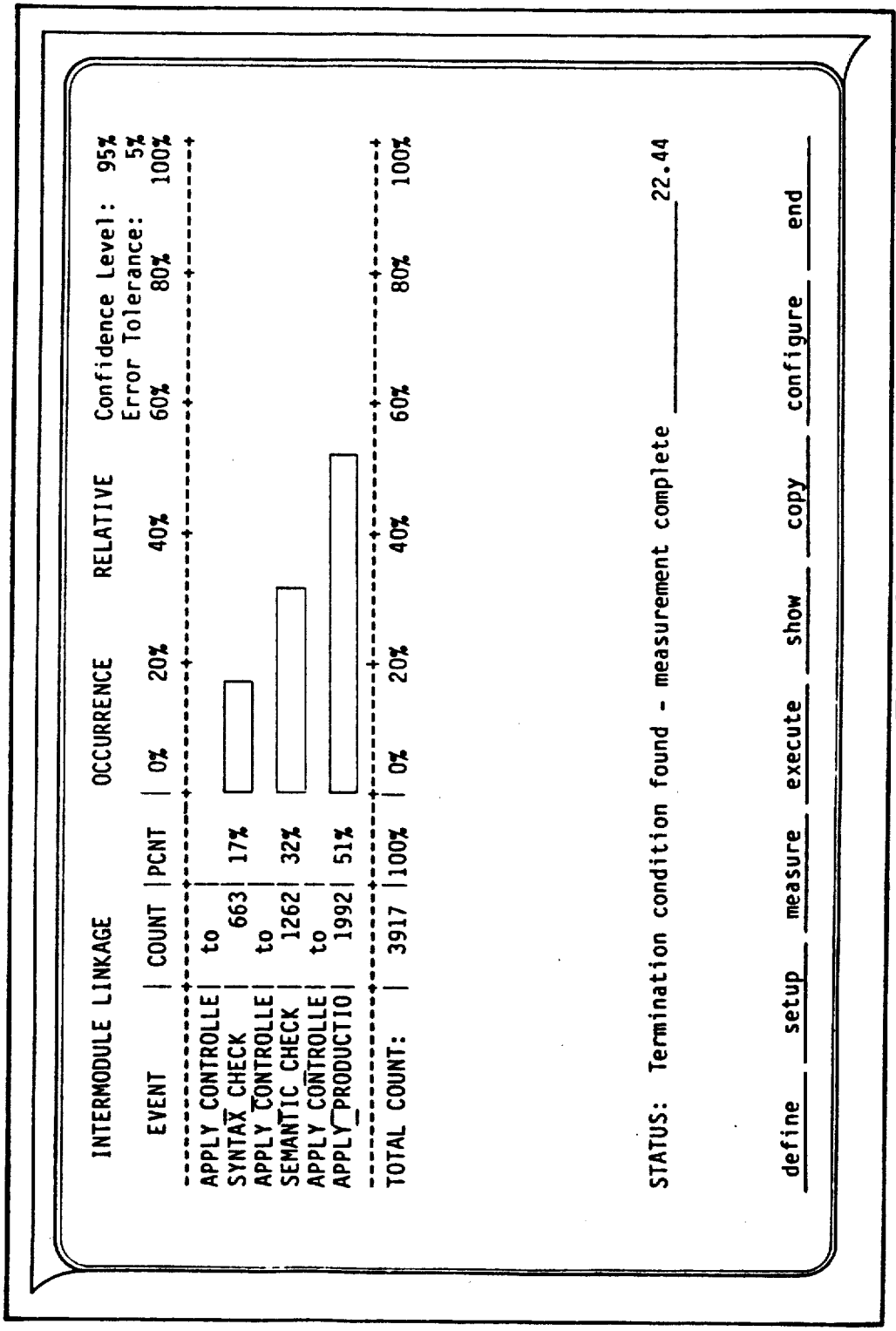
FIG. 10 is an illustration of the histogram presentation of the intermodule linkage measurement of the invention.

Intermodule linkage measurements, such as the one shown in FIG. 10, show which program flow paths are used most extensively. Modules interacting with subroutines too often may be targets for program restructuring to avoid such heavy interaction. When the interaction is valid however, the measurement points to areas for possible code optimization, in the subroutines for example, to enhance overall system performance.

Measurement Algorithm

When making a measurement the performance analyzer randomly selects an address or time event from a list of up to twelve events selected by the user. The randomly selected event is monitored for a selected amount of time specified by the user. At the end of the specified amount of time for monitoring the collected data for that address event is melded with previously stored data and the next event in the list monitored, and so on until the complete list has been monitored. This sampling process continues until it is either halted by the user or some preselected condition obtains. The latter may include the occurrence of a particular event in the system under test or it may be the acquisition of enough data to present a statistically valid result.

This random sampling data acquisition algorithm, while statistically accurate, imposes significant amounts of analyzer "dead time" with respect to individual events. Depending on the measurement, and analyzer setup, a particular event may be monitored only every 4 ms. Some measurements require continuous monitoring, and cannot tolerate such amounts of analyzer dead time. In analyzing stack usage, for example, some portions of the stack are used infrequently. The normal scanning method, by virtue of its imposed dead time, may not capture such sporadic behavior. In cases such as this, the alternate "real-time" acquisition mode may be applied. Allowing nearly continuous monitoring of two program or memory address events, data acquisition is interrupted in this mode for only 40 us every second. This short interruption, accounting for only 0.004% of total acquisition time, allows capture of relatively brief, yet, perhaps, extremely important events.

Measurement Enable/Disable

In many cases, software performance measurements are meaningful only after specific events have occurred. A "measurement enable" condition may be specified, to define the point at which data acquisition should begin. These enabling conditions may be specified in a number of ways as outlined below:

address PORT_1A
    address 762DH
    address range STACK_1 thru STACK_2
    address range OEFFH thru OFFFH
    module READ_PORT
    module range TEST_1A thru TEST_1B
    line_number 13 in_file IO_UTIL
    line_number range 45 thru 77 in_file PORT It is possible to enable a measurement based on the number of times an event occurred. For instance, the measurement could be initiated after location PORT_IA is written to twelve times.

Further measurement starting point qualification is available through use of a two-term measurement enable sequence. Suppose system performance is normal as long as module A is never followed by module C. With the use of the two-term measurement enable sequence, the software performance analyzer can remain idle until module C is entered immediately after module A is executed.

Of similar importance is the ability to specify a measurement disable condition, after which the analyzer will no longer collect data. The conditions listed previously may also be used in this specification. For example, a system may exhibit poor performance characteristics until a specific program module is executed. As degraded performance may exist only for a short period of time, the associated performance information may become statistically insignificant when viewed in relationship to overall system activity. Judicious selection of the measurement disable condition in this situation causes the analyzer to stop acquiring data and presents the user with performance information relative to the specific problem being tracked.

Measurement enable and disable conditions, used separately or together, focus measurements on specific areas of concern, and prevent data from being lost in a much larger, overall measurement.

Measurement Windowing

The windowing function is used primarily in situations requiring context recognition. In systems using overlay structures for example, it may be desirable to carry out performance analysis only when a specific overlay is in use. In other applications, general purpose routines may fail to satisfy performance criteria when invoked in a specific sequence. The windowing capability of the software performance analyzer allows the user to isolate, quickly analyze, and resolve problems in such situations.

Conceptually similar to the measurement enable/disable function, windowing provides performance measurements relative to a particular program area. Specified by window enable and window disable conditions, this feature also allows isolation of code segments important to a specific measurement.

Figure 11:
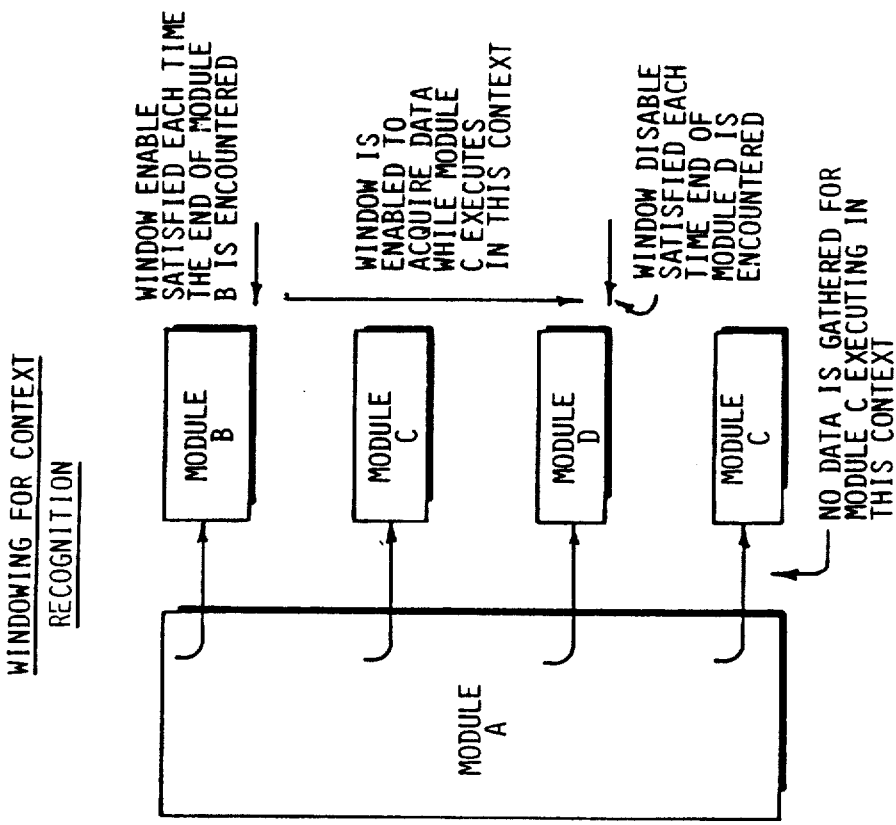
FIG. 11 is an idealized flow diagram illustrating the notion of windowing to obtain context recognition in the operation of invention.

When the window disable condition is met, the analyzer is only temporarily disabled and resumes data collection as soon as the window enable condition is once again encountered. The window may transition from enable to disable and back many times during a measurement, providing, in a sense, a filter for the information acquired by the analyzer. FIG. 11 illustrates the windowing concept.

Circuit Operation

Figure 12:
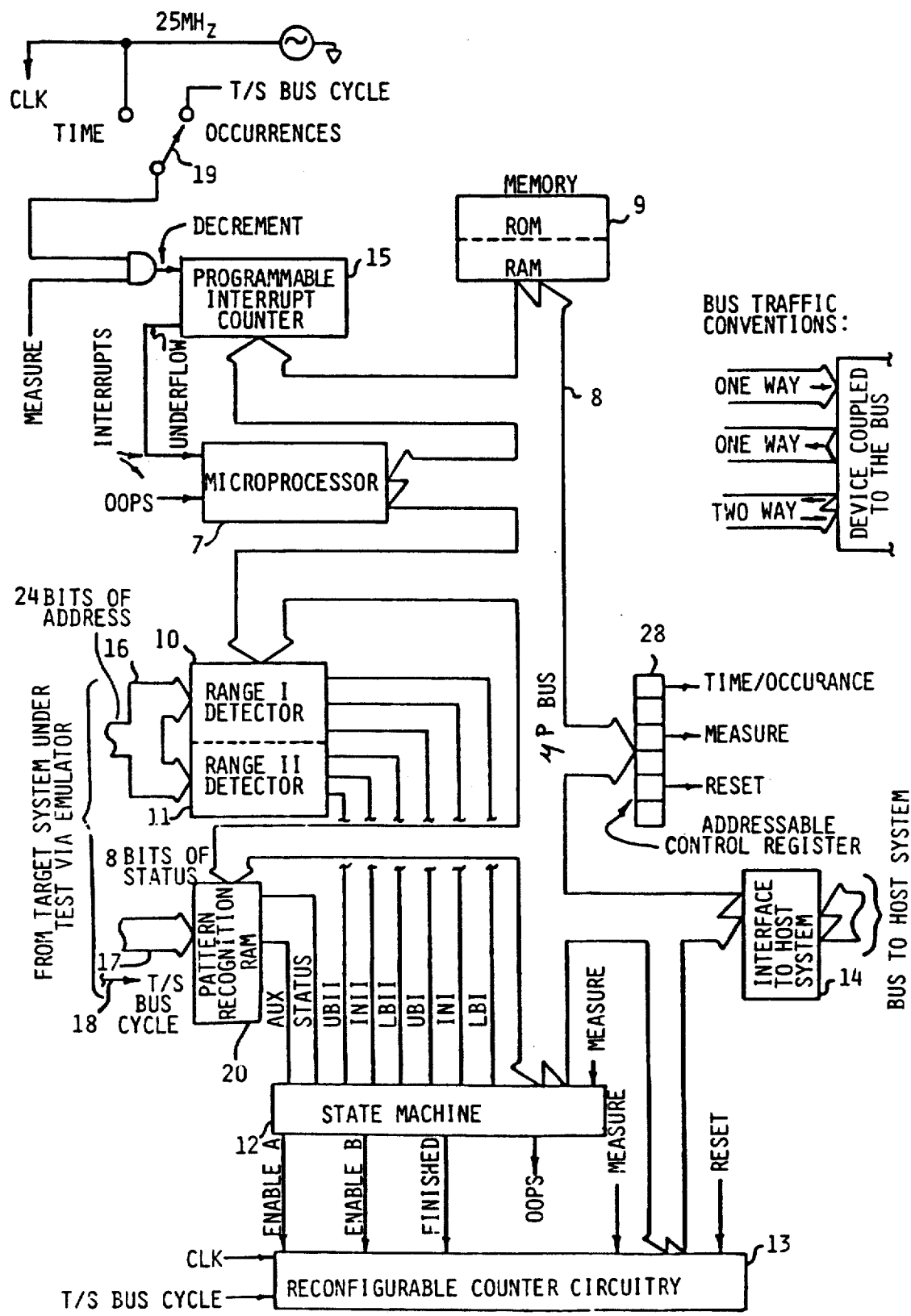
FIG. 12 is a simplified block diagram of a printed circuit board incorporating the invention and that is a plug-in option to the host system of FIG. 1.

We now end the preceding examination of what the invention does for the user and turn instead to an examination of how it does those things. Refer now to FIG. 12, which is a simplified block diagram of the printed circuit board that plugs into the microprocessor development system 1 of FIG. 1.

Figure 13:
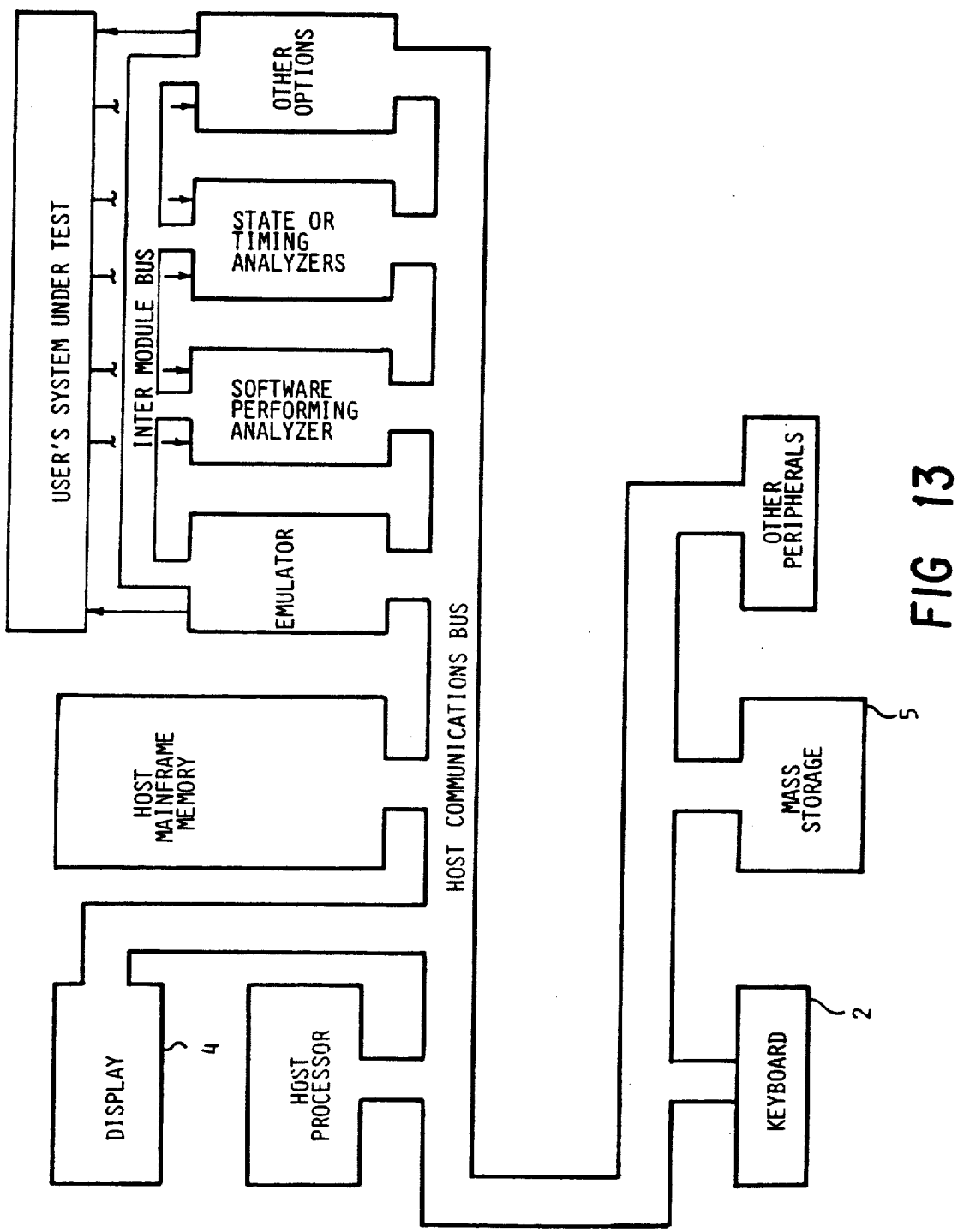
FIG. 13 is a simplified block diagram of the microprocessor development system shown in FIG. 1.

Here is an overview of how software performance measurements are accomplished. The block diagram of FIG. 12 is coupled by an interface 14 to the host system. In the present embodiment that host is the microprocessor development system 1 of FIG. 1. The block diagram of that system is similar to a computer and is shown in greatly simplified form in FIG. 13. If the software performance analyzer were constructed as a stand-alone device the overall block diagram thereof would strongly resemble FIG. 13. The blocks marked EMULATOR, STATE OR TIMING ANALYZERS and OTHER OPTIONS would probably be absent, and it would be understood that "front end" of the software performance analyzer would include the necessary probing, signal conditioning and level sensing circuitry needed to connect directly to an actual microprocessor.

In any event, the user also installs certain controlling software into the host system when he installs the hardware portion of the software performance analyzer. That controlling software implements the various commands through which the user will operate the software performance analyzer. As those commands are invoked the controlling parameters for the various measurements emerge and are used to configure certain elements of FIG. 12 and to control the operation of that circuitry. Upon the completion of the measurement various raw data are transmitted from the circuitry of FIG. 12 back to the host system of FIG. 13. There the performance analyzer software installed in the host completes the measurement by reducing the data and creating the various displays previously presented in FIGS. 2–10.

Referring again to FIG. 12, a microprocessor 7 controls a up bus 8 to which are coupled a memory 9 including both ROM and RAM, a pair of programmable range detectors 10 and 11, a state machine 12, reconfigurable counter circuitry 13, a programmable interrupt counter 15, a programmable pattern recognition RAM 20, an addressable control register 28 and an interface 14 to the host system 1.

Three types of data from the target system under test are supplied to the circuitry in the block diagram of FIG. 12. These are as many as twenty-four bits of address data 16, as many as eight bits of status information 17 and a signal called T/S BUS CYCLE (for "target system bus cycle"). As disclosed for the present embodiment these data originate in the emulator executing the target software. If the software performance analyzer were constructed as a stand-alone measurement instrument these data would originate by probing an actual microprocessor, much in the same way as is done by logic state analyzers. In any event, some preprocessing captures up to twenty-four bits of memory address, up to eight bits of status, and generates the signal T/S BUS CYCLE. The latter represents an episode of information transfer (of a byte, word or whatever) on the bus controlled by the microprocessor (actual or emulated) in the target system.

To continue the overview of how software performance measurements are accomplished, the microprocessor 7 receives indications through the interface 14 of exactly what measurement is to be performed, what the specific ranges are, when to start, when to stop, etc. Firmware encoded in the ROM portion of memory 9 is then used to configure the following circuit elements as described below.

First, if there is a table of address ranges that pertain to an activity or linkage measurement that table is constructed in the RAM portion of memory 9. The first (randomly selected) or next address range in the table is determined and used to configure the range I detector 10, and if the measurement is a real-time activity measurement, the range II detector 11, also. (These programmable range detectors may be of any convenient and suitable sort, and may, for example, comprise the type of range detector disclosed in the following U.S. patent application: METHOD AND APPARATUS FOR DETERMINING IF A DIGITAL VALUE LIES WITHIN A RANGE; S/N 06/392,980; filed 28 June 1982 by Nygaard and Palmer assigned to Hewlett-Packard Company, and now issued as U.S. Pat. No. 4,554,632. Other suitably programmable range detectors may also be used.) Other measurements involve a table of time intervals. That table is also constructed in the RAM, but is not used to configure the range detectors. Instead, those ranges are used in setting up the reconfigurable counter circuitry 13. For these types of measurements an appropriate and constant address range is set into the range detector.

Next, a programmable interrupt counter 15 is configured to represent either the length of time or number of target system bus cycles for which each range in the table is to be monitored. Prior to the start of a monitoring period the counter 15 is preloaded with an appropriate value. As the monitoring period proceeds the counter is decremented, resulting eventually in an underflow as the count drops below zero. The underflow interrupts the microprocessor 7 to signify the end of the monitoring period. In the absence of user instructions to the contrary, the controlling firmware associated with software performance analyzer sets a measurement dependent default value for the monitoring period.

Also, switch 19 is set to reflect whether it is a time interval or the occurrence of a selected number of target system bus cycles that is to determine when to stop monitoring one range and begin monitoring the next. (A brief note concerning switch 19, and other similar functions to be encountered. "Switch" 19 is not mechanical switch at all, but gating whose output is controlled by bits written into the addressable control register 28 coupled to the up bus 8.)

The microprocessor 7 also configures the pattern recognition RAM 20 to recognize the type of target system transaction that the user indicated was to be included in the measurement.

Throughout the measurement certain housekeeping and control activities are accomplished by the microprocessor's 7 changing of various bits in the addressable control register 28. These allow selecting time or occurrence to be the unit of measure for the period of monitoring each range in the list, clearing the counters in the reconfigurable counter circuitry 13 by transmitting a clear command, resetting certain latches in the reconfigurable counter circuitry 13 with RESET, and starting and stopping the various measurement periods with MEASURE.

Finally, the microprocessor configures various counters in the reconfigurable counter circuitry 13. The microprocessor 7 also adjusts the operation of the state machine 12. This state machine is rather complex in that it incorporates much of the logic needed to control the high speed realtime aspects of all the various measurements. The microprocessor 7 enables and disables the appropriate parts of the state machine's ASM chart by writing into certain control registers values used as qualifiers in the overall state machine algorithm. The adjusting of the state machine and the reconfiguration of the counters will be examined below for each of the various types of measurements.

As the measurement proceeds, the pattern recognition RAM 20 translates the eight status bits 17 into certain useful separate signals, STATUS AND AUX. To a certain extent, the nature of this operation is dependent upon the target microprocessor or emulator. STATUS is true whenever the transaction on the bus is the sort of transaction specified by the user when he set up the measurement. AUX is used for certain auxiliary purposes. The resulting bus status information is applied as input data to the state machine 12, along with the output signals from the range detectors 10 and 11. Range detector I 10, for example, outputs the three signals UBI, INI and LBI. These stand for the conditions "address equals upper bound range 1," "address within range I," and "address equals lower bound range 1." The outputs UBII, INII and LBII from the other range detector 11 have corresponding meanings with respect to range II. The state machine uses the six lines of address range information, in conjunction with the decoded bus status information, to produce four signals that control the activities of the configured counters of circuitry 13. Those four signals are ENABLE A, ENABLE B, FINISHED, and OOPS. In a manner that will be explained below for each type of measurement, the first three of those signals determine how various counters respond to transitions in the signal CLK (counted to measure times) and T/S BUS CYCLE (counted to measure occurrences).

At the end of a monitoring period the microprocessor 7 interrogates the values of the counters and accumulates those values into various intermediate results stored in the RAM portion of the memory 9. At the conclusion of the measurement the microprocessor 7 transmits the final accumulated intermediate results to the controlling firmware in the host for data reduction. In particular, at the conclusion of a period for monitoring the current range counter 15 produces an output to signify that conclusion. That output is applied to the interrupt input of the microprocessor 7, which then sets MEASURE false, interrogates the necessary counters in circuitry 13, clears those counters with a clear command, loads the next range from the list into the range detector (s), and then sets MEASURE true again.

Figure 14:
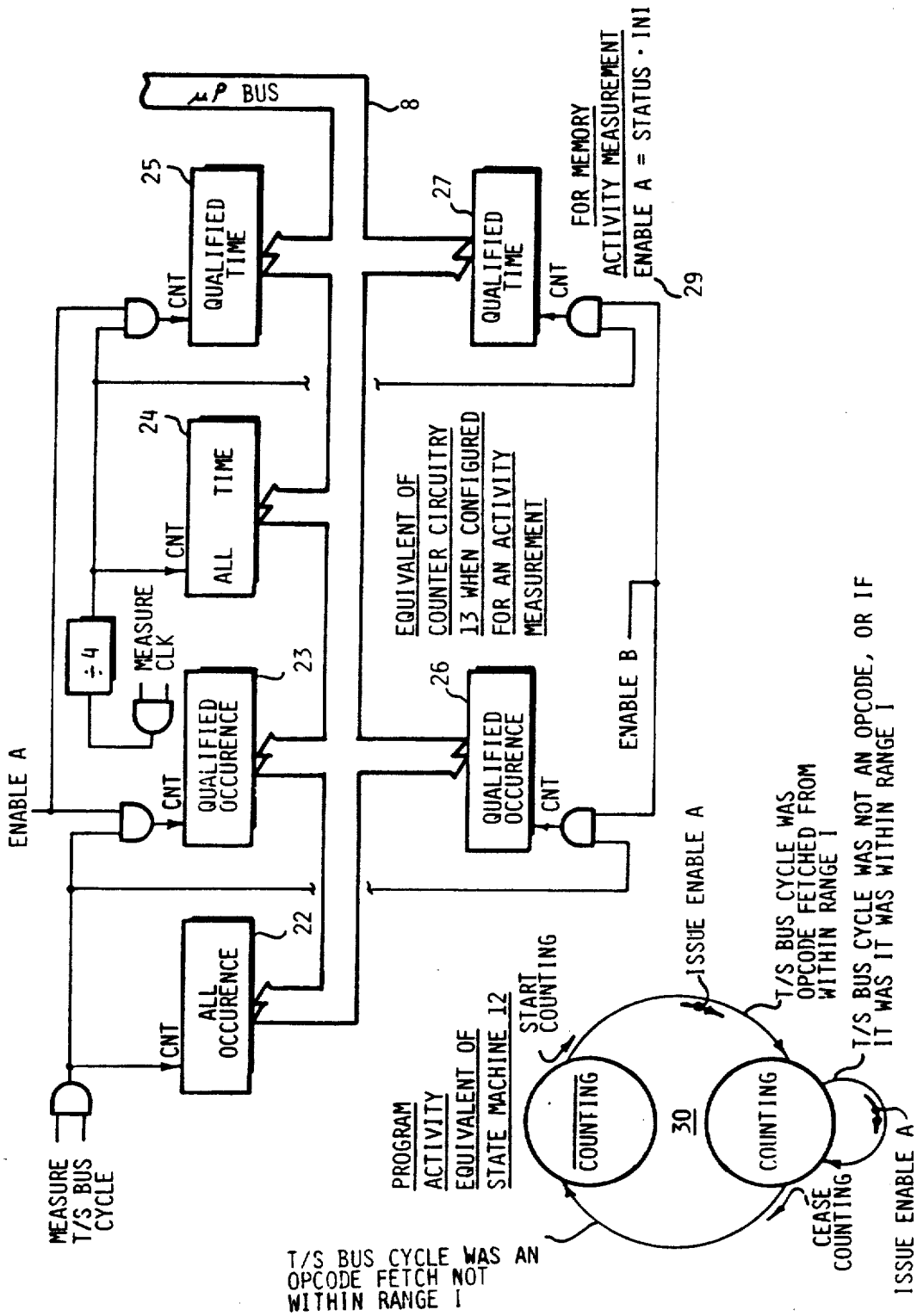
FIG. 14 is a simplified amplification of the reconfigurable counter circuitry of FIG. 12 showing how it is configured to perform memory and program activity measurements, and also includes a simplified equivalent of the state machine used for controlling those measurements.

Referring now to FIG. 14, shown there are a simplified equivalent block diagram of how the counter circuitry 13 is configured for an activity measurement (either memory or program) and a simplified equivalent of the state machine used to control the counters.

Counters 22 through 27 are each sophisticated programmable counters that are coupled to and controlled by the up bus 8. In the present embodiment these counters are implemented with three type 9415 counters manufactured by Advanced Micro Devices, Inc. Each type 9415 counter contains five 16-bit counters that may be interconnected and programmed in a wide variety of ways. It will be apparent to those skilled in the art that other suitable counters and interconnecting circuitry may be used in place of the AMD type 9415 counters described here. The input labeled "CNT" for each of these counters is where a pulse or transition to be counted is applied.

Consider first the case of a "normal" activity measurement, where the address ranges in the list are monitored in sequence following a random initial selection. (That is, not the "real-time" case where two ranges are actually monitored simultaneously.) In the "normal" case to be considered first, counters 26, 27 and the signal ENABLE B are of no interest. ENABLE B is inactive, and counters 26 and 27 are never interrogated to learn their contents. What then, of counters 22-25 and EN-ABLE A?.

Before beginning to monitor activity in an address range the microprocessor 7 interrogates those counters to learn the final counts for the previously monitored address range. Then the counters are reset and the next monitoring period begins. In the case of a memory activity measurement the pattern recognition RAM 20 will have been previously programmed to produce the signal STATUS whenever the eight bits of status 17 indicate that the desired type of memory cycle is occurring on the target system's bus. For example, the user may wish to include only memory reads inside a specified range within his memory activity measurement. As shown by the equation 29 in FIG. 14, ENABLE A is issued by the state machine whenever STATUS is true and the memory address bits 16 are within the specified range 1. During the monitoring period ENABLE A may come and go as memory access activity moves in and out of the range being monitored. An inspection of FIG. 14 will quickly reveal that counter 22 will accumulate the total number of target system bus cycles occurring during the period of time the present range is being monitored. Counter 23 will accumulate the number of qualified memory cycles of interest. Counters 24 and 25 accumulate counts that respectively correspond to those of counters 22 and 23, except that the counts represent time.

During the course of the measurement the two occurrence counts and the two time counts obtained at the end of each monitoring period are added to the sum of their accumulated predecessors. That is, for each range i to be monitored the controlling software produces $\Sigma$ all occurrence$_i$, $\Sigma$ qualified occurrence$_i$, $\sigma$ all time$_i$ and $\Sigma$ qualified time$_i$. That is, if there are to be six bars in the histogram, at the conclusion of the final monitoring period and after its four counts have been added to their accumulated predecessors, there will be twenty-four accumulated sums in the RAM portion of the memory 9. Namely, six sets of the four $\Sigma$ terms set out above. For each of the i-many ranges the relative occurrence value of that range (i.e., the length of the histogram bar or the value of the tabular entry) is found by dividing the individual $\Sigma$ qualified occurrence$_i$ for that range by the sum of the i-many $\Sigma$ qualified occurrence$_i$ for all of the i's. The relative time value is found in a corresponding fashion, using $\Sigma$ qualified time$_i$ in place of $\Sigma$ qualified occurrence$_i$. To find the absolute values for occurrence for each of the i-many ranges, each individual $\Sigma$ qualified occurrence$_i$ is divided by its corresponding $\Sigma$ all occurrence$_i$. Absolute time values are found in a similar fashion using $\Sigma$ all time$_i$ in place of $\Sigma$ all occurrence$_i$. The four resulting values are each converted to percentages by multiplying them by one hundred.

The difference between memory activity measurements and program activity measurements involves a different rule for controlling ENABLE A. To explain this difference the state diagram 30 is useful. The assumption behind a program activity measurement is that a program segment that is the subject of the measurement is entirely contiguous. The state diagram 30 shows that ENABLE A is issued once an instruction is fetched from within the range of the program, and stays issued until there was an instruction fetch not within the program. Other than that, values are accumulated in counters 22-25 and relative and absolute are answers found as previously explained.

To this point the explanation has concerned a "normal" activity measurement. Only one range detector has been employed, as only one address range in the list was being monitored. For a "normal" activity measurement statistical properties are relied upon to produce valid results during sequential monitoring of each range in the list. In contrast, the real-time activity measurement provides nearly continuous monitoring of two selected address ranges. It is to this mode of measurement that we now turn our attention.

In a real-time activity measurement a second range is programmed into the range II detector 11. The state machine 12 is configured to implement two copies of the appropriate rules for controlling the enable signals ENABLE A and ENABLE B. For a real-time memory activity measurement those two rules are the equations:

ENABLE A = STATUS·INI

ENABLE B = STATUS·INII

For a real-time program activity measurement the state diagram 30 remains as before, only now there is a second structurally identical state diagram that concerns range 11 in place of range I and issues ENABLE B in place of ENABLE A. The two state diagrams are executed in parallel, either by two separate state machines or by one "super state machine" that is the logical equivalent of the two separate state machines. The present embodiment implements the latter course.

It can be seen then that counter 26 accumulates information of the same nature as counter 23, except that it is for the second range. Likewise, counter 27 accumulates information corresponding to that in counter 25, save for pertaining to the second range. It will also be noted that the data in all the counters 22-27 are indeed acquired simultaneously in real-time. In the present embodiment a real-time monitoring cycle is automatically set to last one second. At the end of that period a 40 us break occurs while the microprocessor 7 unloads the counters. Then another monitoring cycle is initiated with the same two ranges. This process continues until the measurement is complete, as determined by any of the usual criteria.

Figure 15:
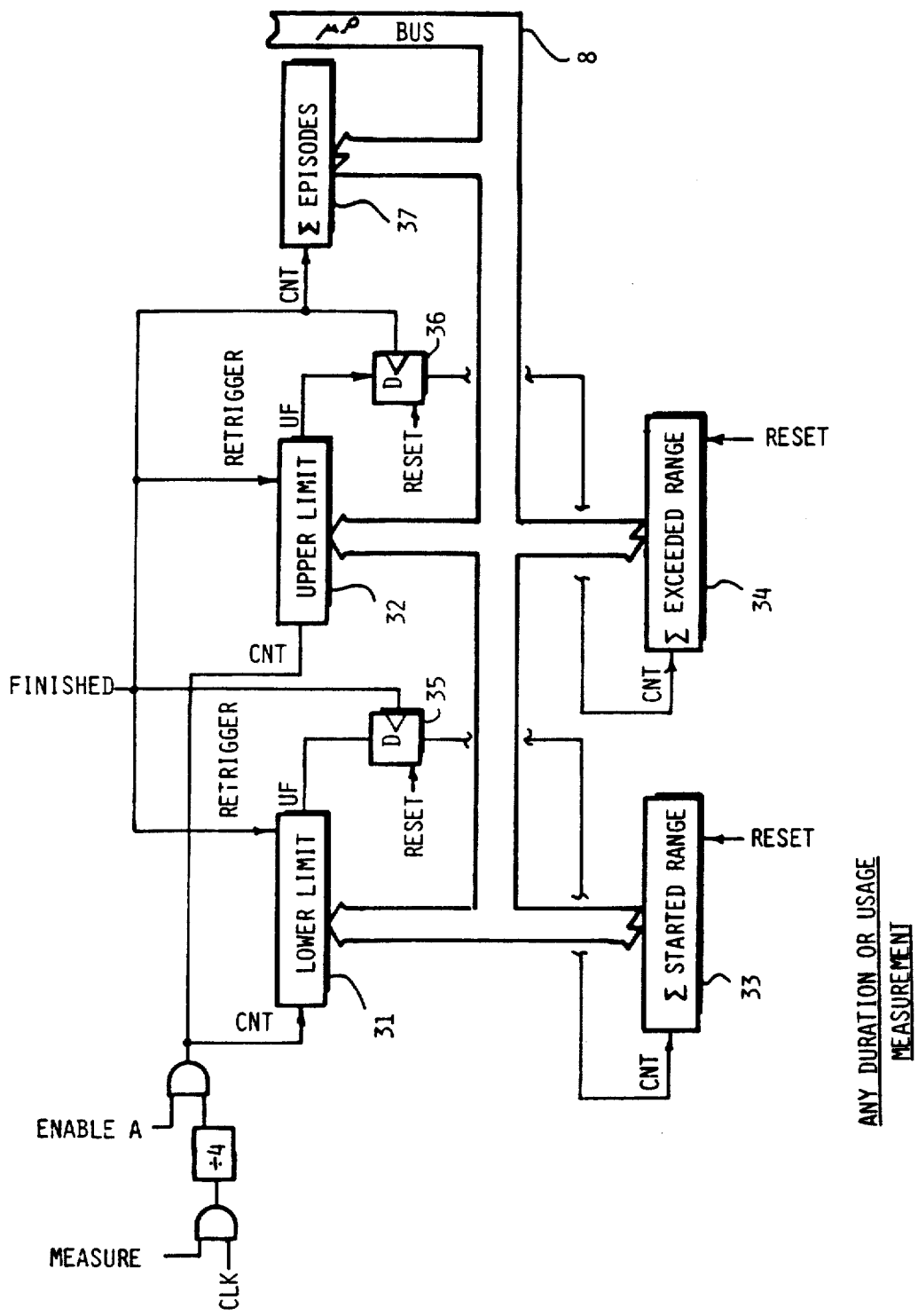
FIG. 15 is a simplified amplification of the reconfigurable counter circuitry of FIG. 12 showing how it is configured for any duration or usage measurement.

Referring now to FIG. 15, shown there is the equivalent rearrangement of the counter circuitry 13 when performing any duration or usage measurement. Any of those types of measurements involves measuring the time interval between a start event and a stop event, and determining if that time lies within a particular range of times taken from a list of possible ranges. What the counter circuitry must provide is an indication of how many times during a monitoring period the interim between the start and stop events fell within the range currently being monitored. Keep in mind that at the conclusion of the monitoring period what changes is the time range, not the meaning or definition of the start and stop events themselves.

Referring again to FIG. 12, to make such a measurement the microprocessor 7 controls the onset and duration of the monitoring period with the signal MEASURE and the programmable interrupt counter 15, as previously described in connection with activity measurements. Also, the microprocessor 7 receives from the controlling software in the host system the address boundaries of the module whose duration is sought or the exit and entry addresses that, in either case, respectively correspond to the start and stop events needed to define a time interval. These address boundaries are considered as if they were a range, and are used to program the range I detector 10. The microprocessor 7 also determines the first or next time interval that is to be monitored, and configures the counter circuitry 13 in a manner described below. It also adjusts the operational properties of the state machine 12.

Returning now to FIG. 15, counters 31 and 32 are each set to count down from a preset value initially supplied to the counter. The signals CNT cause a decrement of one count. When the count reaches zero an underflow signal UF is issued. Upon application of a signal RETRIGGER the counters 31 and 32 return to their initial preset values, and ready to decrement again. Counters 33, 34 and 37 are set to increment by one count for each cycle applied to their CNT inputs. Here is how it all works.

Counter 31 is loaded with a preset value corresponding to the lower boundary of the time interval to be monitored; counter 32 is loaded with a preset value corresponding to the upper boundary. Counters 33, 34 and 37 are cleared with a clear command issued by the microprocessor 7, which also briefly issues RESET to clear latches 35 and 36. A monitoring period begins when MEASURE goes true, and will commence with counters 31 and 32 having already been retriggered, and counters 33, 34 and 37 already cleared. The state machine 12 will issue ENABLE A whenever the start event has occurred and there has not yet been a corresponding stop event. Upon the occurrence of the stop event ENABLE A is withdrawn and FINISHED is (eventually) issued. In the interim certain conditions of interest will have occurred in the counters 31 and 32. The interim time falls with the interval of interest if the interim exceeds the lower boundary of the interval without exceeding the upper boundary. The combinations of UF outputs from counters 31 and 32 represent the various possibilities of the interim being less than, within, or in excess of the range of interest. At the time FINISHED is issued the values of the two UF signals from counters 31 and 32 are respectively captured in D-type latches 35 and 36. The captured UF outputs appear at the outputs of the latches 35 and 36 and are respectively coupled to the CNT inputs of counters 33 and 34. Thus, counter 33 accumulates the number of times during the monitoring period that the lower boundary was exceeded. Likewise, counter 34 accumulates the number of times the interim was in excess of the interval. A moment's reflection will confirm that the number of times during the monitoring period that the interim fell within the range is the same as the count in counter 33 diminished by the count in counter 34. At the conclusion of the monitoring period those two counts are supplied to the data reduction software, where their difference is determined and incorporated into the measurement data.

The signal FINISHED retriggers counters 31 and 32, and also increments counter 37. The latter produces the total number of times that pairs of start-stop events occurred during the monitoring period. This value is also supplied to the data reduction software at the conclusion of the monitoring period. It gets added to each such preceding value to form the base from which an absolute result can be calculated.

During the monitoring period ENABLE A might come and go many times. There are various ways this can happen. First, it may be that onsets of ENABLE A and FINISHED always occur in strict pairs, in strict conformance with the preceding paragraphs. In a module duration measurement, for example, such behavior would indicate that the module of interest was executed several times during the monitoring period. There is no harm in this, and this case is fully covered by the preceding descriptions.

The other possibilities concern instances where several transitions of ENABLE A occur before the occurrence of the corresponding FINISHED. At the outset, an inspection of FIG. 15 reveals that all this does is temporarily interrupt the process of decrementing counters 31 and 32. Insofar as this affects their counts it makes a difference, but it does not affect what happens when FINISHED finally does occur. What then, of that effect on the counts?

Suppose the measurement was to "exclude calls". The state machine 12 is configured to observe that the outputs from the range I detector 10 indicate that there was a transfer of control from the interior of the module to some point outside the module. That is, the signal INI went false without a simultaneous disappearance of UBI. (A simultaneous disappearance of INI and UBI would indicate a normal "fall-through" exit at the last instruction in the module, and thus could not represent a "call" to be excluded.) Thus, assuming that modules are contiguous, calls can be detected by the state machine 12. If requested, it detects such calls and removes ENABLE A until the range I detector 10 indicates that control has again returned to the module. By responding to events detected by the pattern recognition RAM 20, and perhaps the range II detector 11, the enable/disable and windowing for context recognition can be implemented as well. In the interest of brevity, a state machine diagram for all of these various possibilities has been omitted, since it is generally known how to fashion a state machine to achieve a well stated end.

The operation of the duration and usage measurements, as described above, is entirely adequate for monitoring target software being executed by target system processors that do not prefetch instructions. In that case FINISHED could be issued by the state machine 12 as ENABLE A is finally withdrawn. However, there are processors that prefetch instructions, and the approach outlined above creates certain problems when used with such processors. These problems are overcome, as described below, by separating the onset of FINISHED from the final withdrawal of ENABLE A, and by issuing and responding to a correction signal OOPS. The prefetch correction algorithm to be described below works correctly whether prefetch is employed or not. Hence, it is not necessary to declare to the software performance analyzer whether or not the target processor uses prefetch. In a preferred embodiment the prefetch correction algorithm is simply always available. As will become clear, it is self-invoking upon the detection of certain conditions.

Prefetching occurs when the processor reads an entire block of executable code into an onboard memory before it is time to actually execute that code. The prefetched instructions are then executed from the onboard memory, but events may preclude all of that code from being executed. For example, part of the way through the prefetched block of code there may be a conditional branch back to the interior of the program segment or a call to another program. The software performance analyzer cannot conclude that the stop event of interest has truly occurred simply because the final instruction in the program segment whose duration is being sought has been fetched as an opcode. Simply prefetching that instruction does not guarantee that it got executed. Since execution of prefetched code is a private affair within the bounds of the processor, some means is needed to distinguish between actual and false stop events.

It appears that the prefetch dilemma affects only duration and usage measurements (i.e., the time distribution measurements). By making certain reasonable assumptions about the nature of the programming being executed it is possible to detect when prefetching has affected the measurement, and then subsequently correct the measurement. These assumptions are that the code within a program segment being measured is contiguous, that the only legitimate place to begin execution of that program segment is at its earliest (lowest address) instruction, and that the only legitimate way to conclude that program segment is to exit by "falling through". That is, by executing the last (highest address) instruction, so that the natural incrementing of the program counter transfers control to the next segment.

If those assumptions are enforced, then it is possible for the software performance analyzer to look for two conditions that "should not happen" during program execution.

Recall that the range detectors 10 and 11 produce separate outputs corresponding to the endpoints of their ranges, as well as a signal indicating that the applied address satisfies the range. This allows the state machine 12 to respond to sequences of events involving the presumed entry and exit points of a program segment. Here is the use that is made of that ability.

The first of the two detectable conditions "that should not happen" is as follows. Suppose a stop event is detected as a result of a prefetch. For example, suppose that for a duration measurement the exit point of the program segment being measured appears as an opcode fetch during a prefetch of a block of code. Suppose also that somewhat later there appears an opcode fetch within the boundaries of the segment, without there having been an opcode fetch for the beginning of the segment. Then it must be the case that prefetch provided a false indication of leaving the program segment.

A moment's reflection will confirm that the way to handle the above situation is to not issue FINISHED until there is a bona fide re-entry into the program segment, as only then can it be known for certain that the preceding stop event (opcode fetch for the last address in the segment) was genuine. The only error involved in this is that there may be a slight discrepancy in time between when the prefetch indicates the program segment was finished and when the final instruction in the segment was actually executed from the onboard memory in the target processor.

The second condition is detected when the state machine 12 observes that the range being monitored is entered twice without an intervening exit. It is true that one legitimate way this could happen is through the recursive actions of re-entrant code, without prefetch being a villain. This possibility is ignored in favor of assuming that a prefetch provided a false indication of entering the program segment or range being monitored. That is, a prefetch "accidentally" fetched as an opcode the first instruction in a program segment being monitored, but that a last minute branch in the "concluding" program transferred control elsewhere, with the result that the program segment of interest was not actually entered. That it was not actually entered can be determined when it is actually entered (or perhaps only again falsely entered), since that produces the second entry without an intervening exit. It is at this point that it may be said with certainty that the counters 31 and 32 were incorrectly started by the ENABLE A corresponding to the first (and false) start event. It is in this circumstance that the state machine 12 issues OOPS.

When OOPS is issued the microprocessor 7 immediately halts the measurement period by withdrawing MEASURE. Then it immediately issues clear instructions to counters 31 and 32. It also briefly issues RESET to reset the latches 35 and 36. Then it re-issues MEASURE without delay so that the real measurement may commence with a minimum of lost time.

Actual entry into the program segment of interest will only be known for certain when an exit is observed. Then it may be said that the preceding entry was valid.

Figure 16:
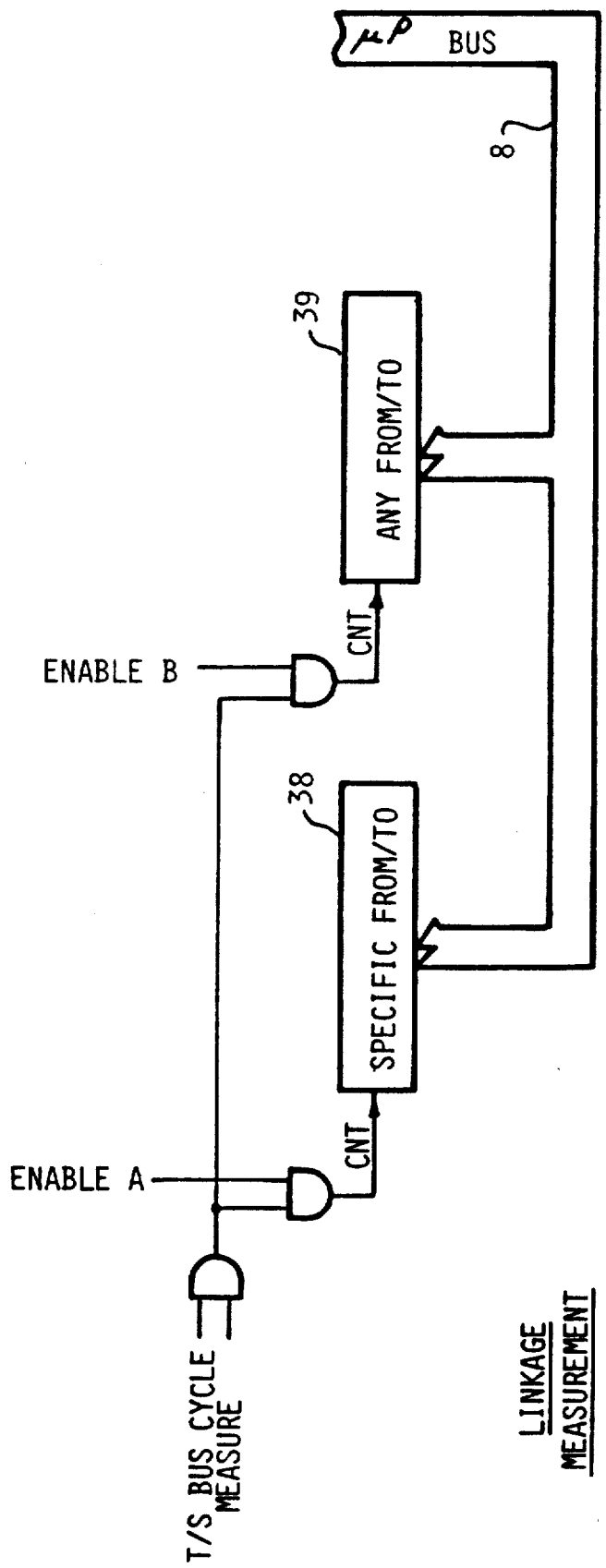
FIG. 16 is a simplified amplification of the reconfigurable counter circuitry of FIG. 12 showing how it is configured during an intermodule linkage measurement.

Referring now to FIG. 16, shown there is the equivalent configuration for counter circuitry 13 when an intermodule linkage measurement is to be performed. Also shown is the corresponding state diagram for the state machine 12 when adjusted for that measurement.

Recall that in this measurement i-many pairs of modules (say, $X_i$ and $Y_i$) are to be monitored to determine the frequency of transitions from $X_i$ to $Y_i$ for each i, as well as from $X_i$ to anywhere for each i. Each i involves ranges for X and Y in a list. Within a monitoring period (i.e., for a given i) the number of transitions from $X_i$ to $Y_i$ and the number of transitions from $X_i$ to anywhere are determined simultaneously. As for the other measurements, i is chosen randomly, then the list is exhausted in order, one monitoring period being used for each pair in the list. The entire measurement comprises a number of such randomly started sequential uses of the pairs in the list. The housekeeping functions of MEASURE to represent a monitoring period and of clearing the counters between monitoring periods remain as previously described for the other measurements. Neglecting such housekeeping, here is how the linkage measurement is performed.

For the ith entry in the list of from-to modules, the address range of the "from" module $X_i$ is loaded into the range I detector 10, and the address range of the "to" module $Y_i$ is loaded into the range II detector 11. The state machine 12 will produce one instance of ENABLE A once each time there is transfer from $X_i$ to $Y_i$, and one instance of ENABLE B for each transfer from $X_i$ to anywhere. Counter 38 counts the number of $X_i$ to $Y_i$ transitions, while counter 39 counts the number of any transitions. At the end of the monitoring period the count in counter 38 is sent by the microprocessor 7 to the data reduction software in the host processor, where it contributes to the relative portion of the answer for the ith transition in the list. The count in counter 39 is sent also, and it contributes to calculating an absolute result.

Figure 17:
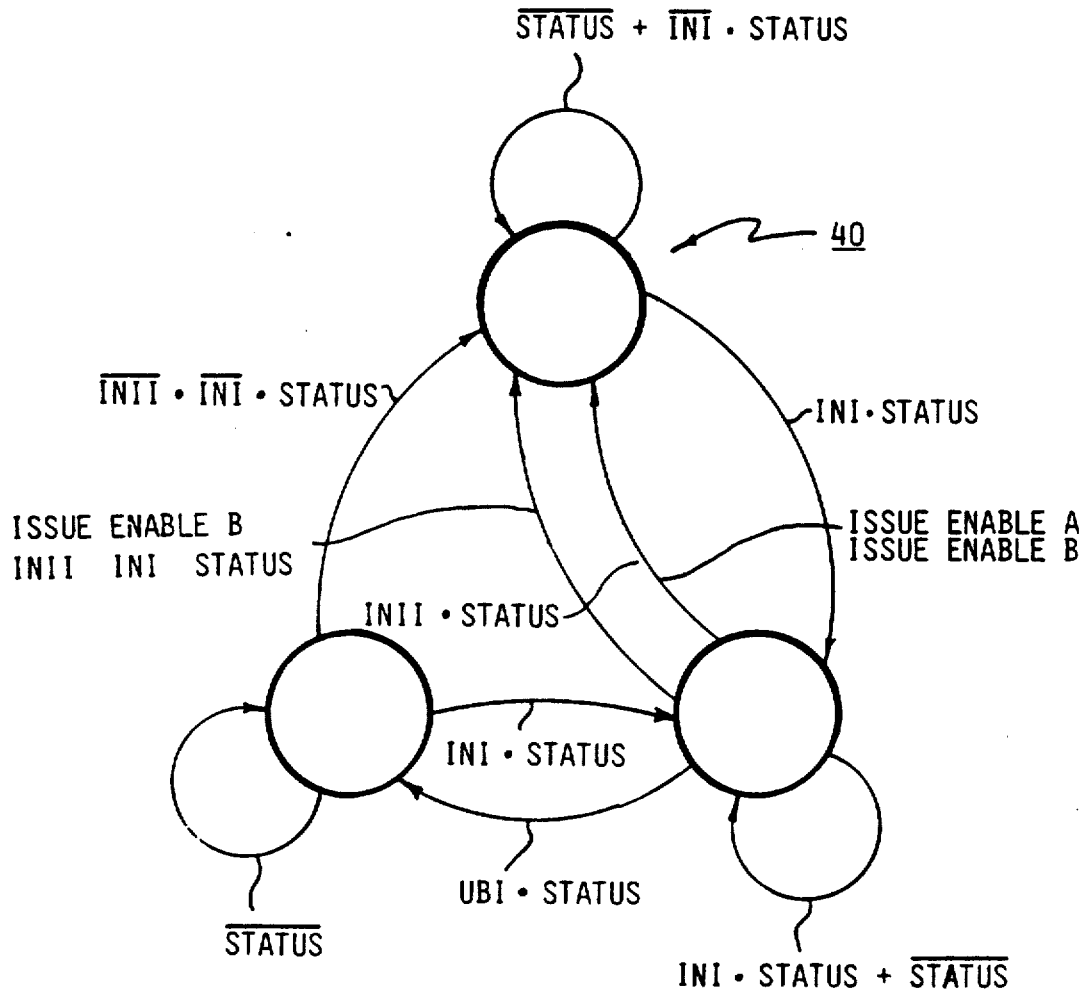
FIG. 17 is a simplified equivalent of the state machine used for controlling the linkage measurement of FIG. 16.

The state diagram 40 in FIG. 17 illustrates how the state machine responds to the various module-to-module transitions that might occur and how it responds by issuing the signals ENABLE A and ENABLE B.

Introduction to the Appendices

The following three appendices A, B, and C are excerpts of the appendices of the same names in the operating manual for one embodiment of the invention. That embodiment comprises the Hewlett-Packard model 64310A Software Performance Analyzer option for any of the Hewlett-Packard 64000 series Logic Development System mainframes. These appendices are useful in answering detailed questions concerning operational possibilities, and include a complete syntactical description of all commands pertaining to the software performance analyzer.

No attempt has been made to bridge any of the slight differences that may occur in terminology. While these may be inconvenient, it is believed that the preceding specification and the following appendices are each sufficiently detailed, self consistent and error free that no ultimate confusion will arise.

The Hewlett-Packard part number of the complete manual of which these appendices are excerpts is 64310-90902.

APPENDIX A
Page i

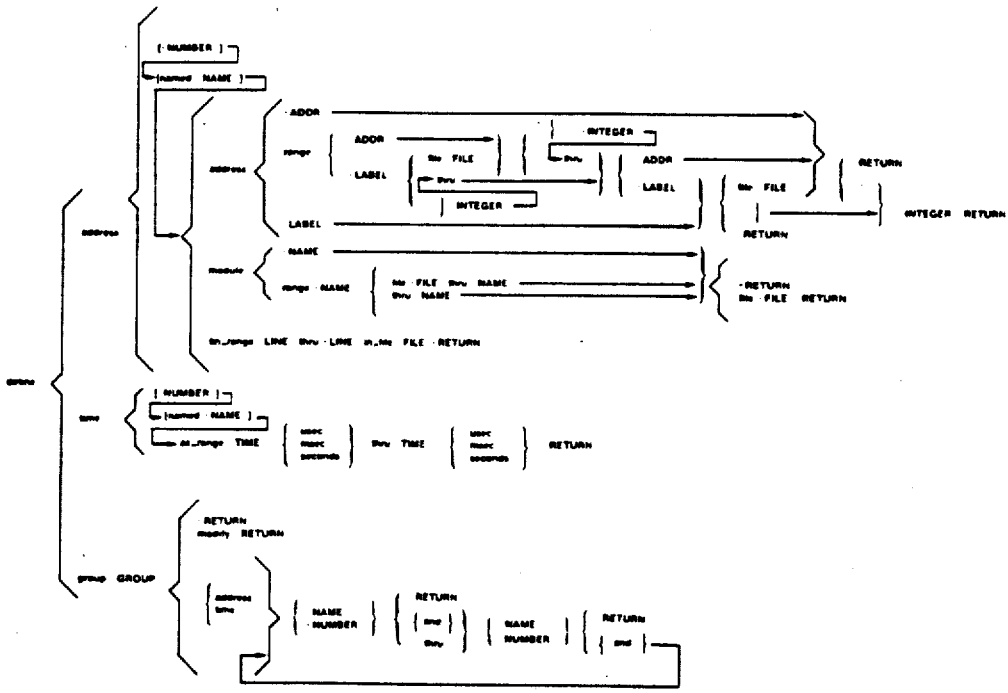

Figure A-1. Define Syntax Diagram

APPENDIX A
Page ii

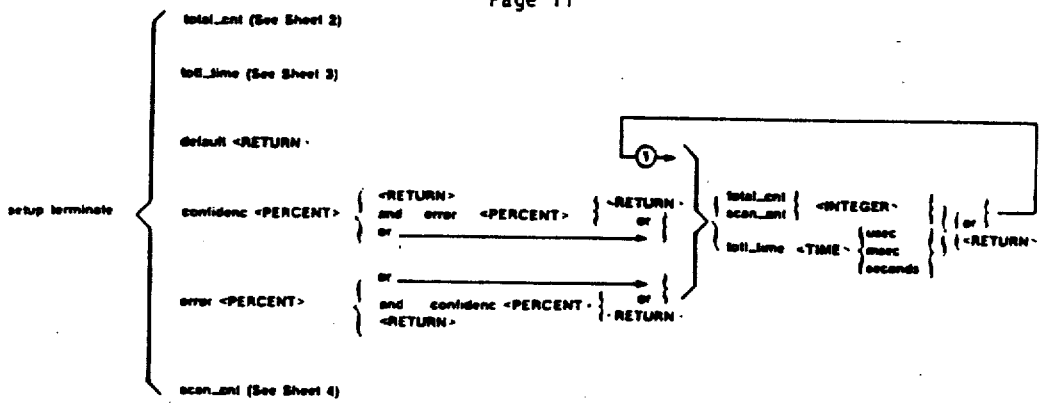

NOTE:
① Softkey selected once will not be present the next time(s) through.

Figure A-2. Setup Terminate Syntax Diagram (Sheet 1 of 4)

APPENDIX A
Page iii
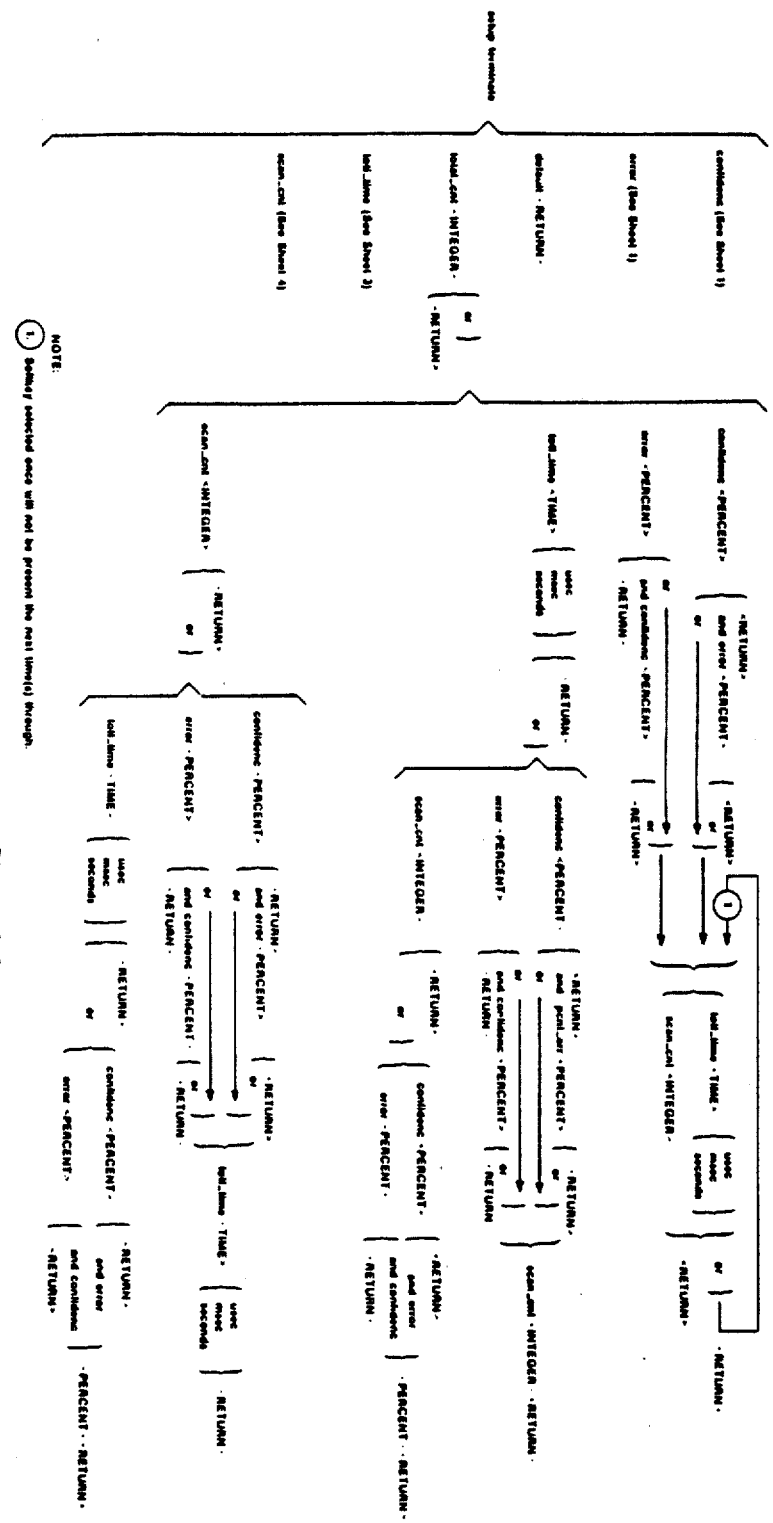
Figure A-2
Setup Terminate Syntax Diagram (Sheet 2 of 4)

APPENDIX A
Page iv
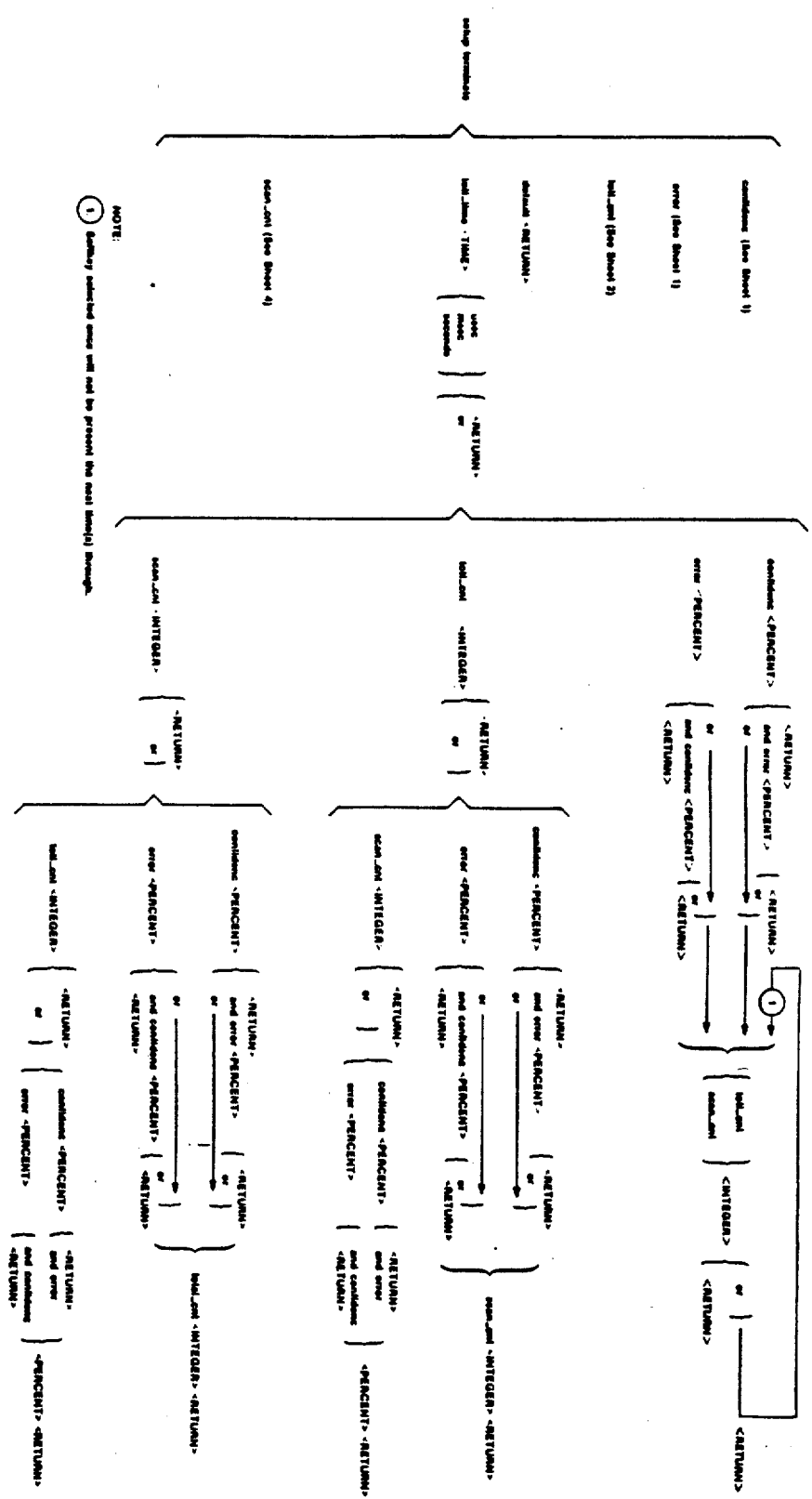
Figure A-2
Setup Terminate Syntax Diagram (Sheet 3 of 4)

APPENDIX A
Page 5
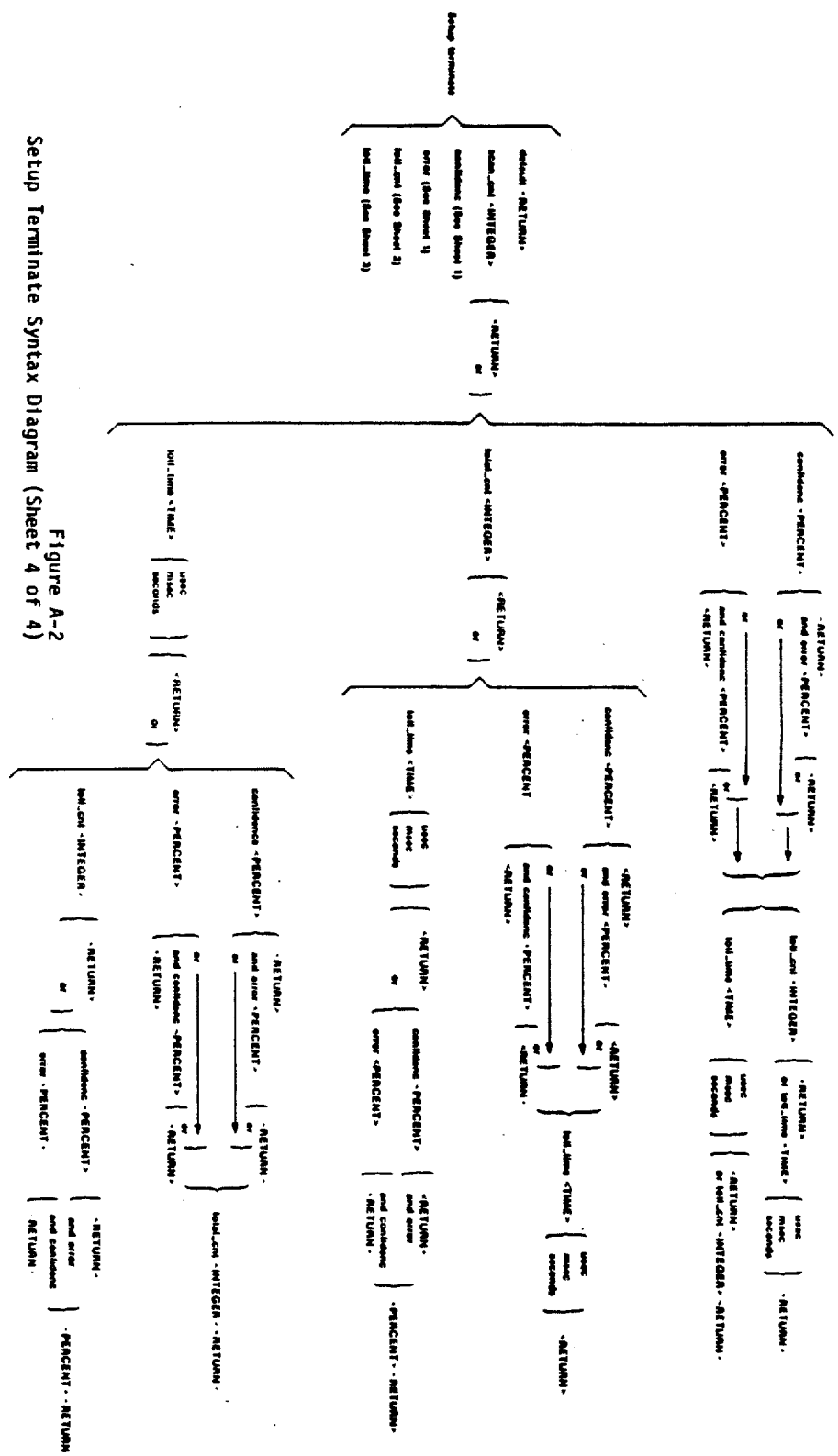
Figure A-2
Setup Terminate Syntax Diagram (Sheet 4 of 4)

APPENDIX A
Page vi
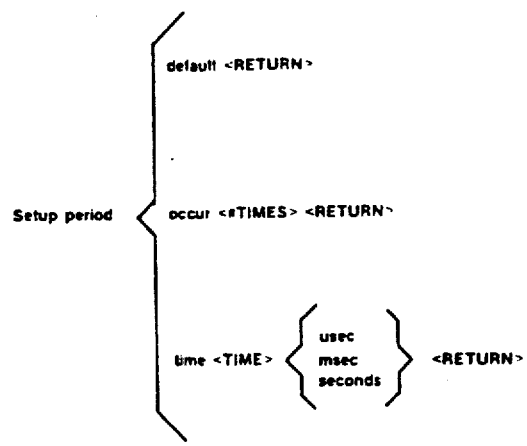
Figure A-3.
Setup Period Syntax Diagram

APPENDIX A
Page vii
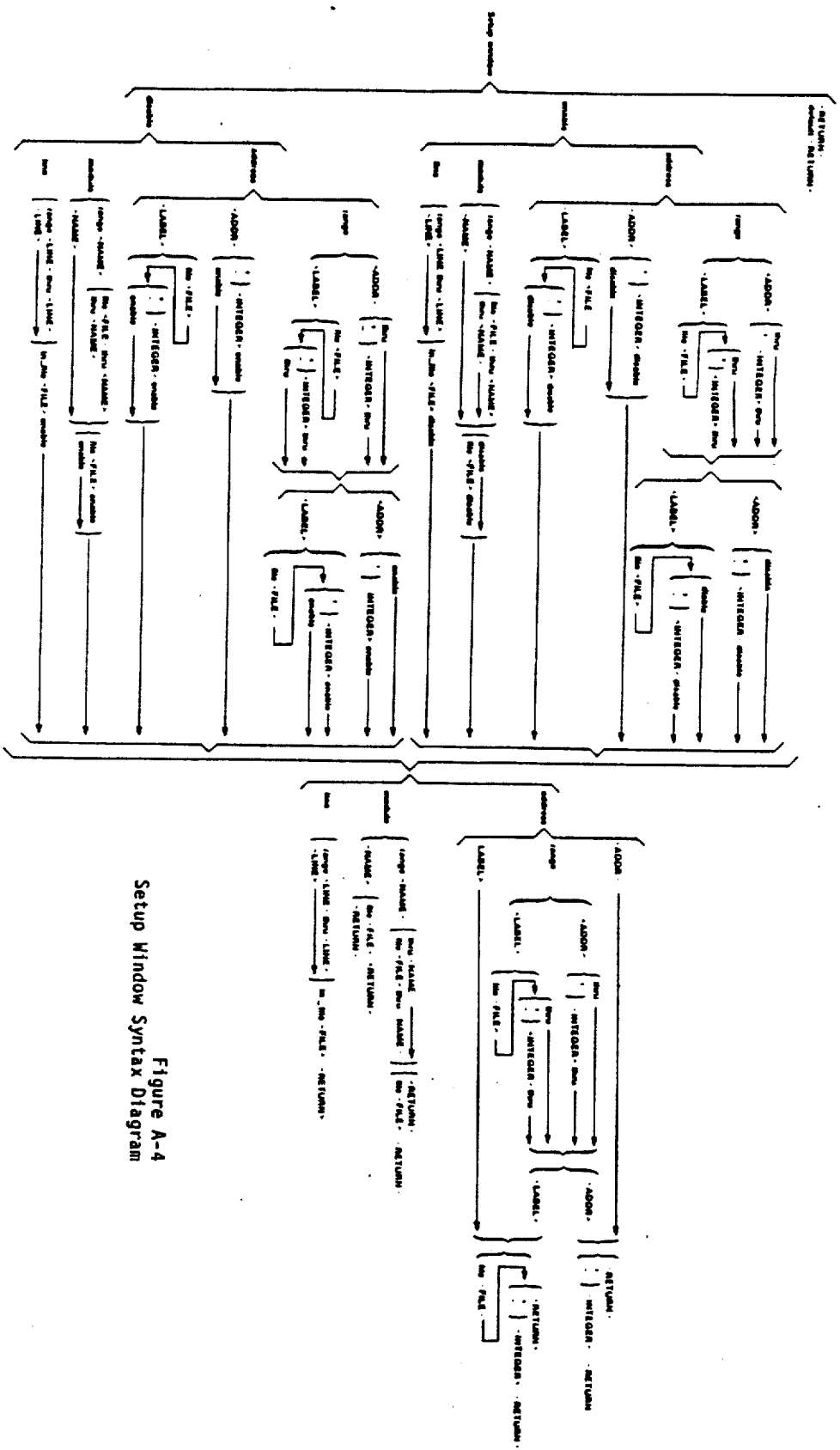
Figure A-4
Setup Window Syntax Diagram

APPENDIX A
Page viii
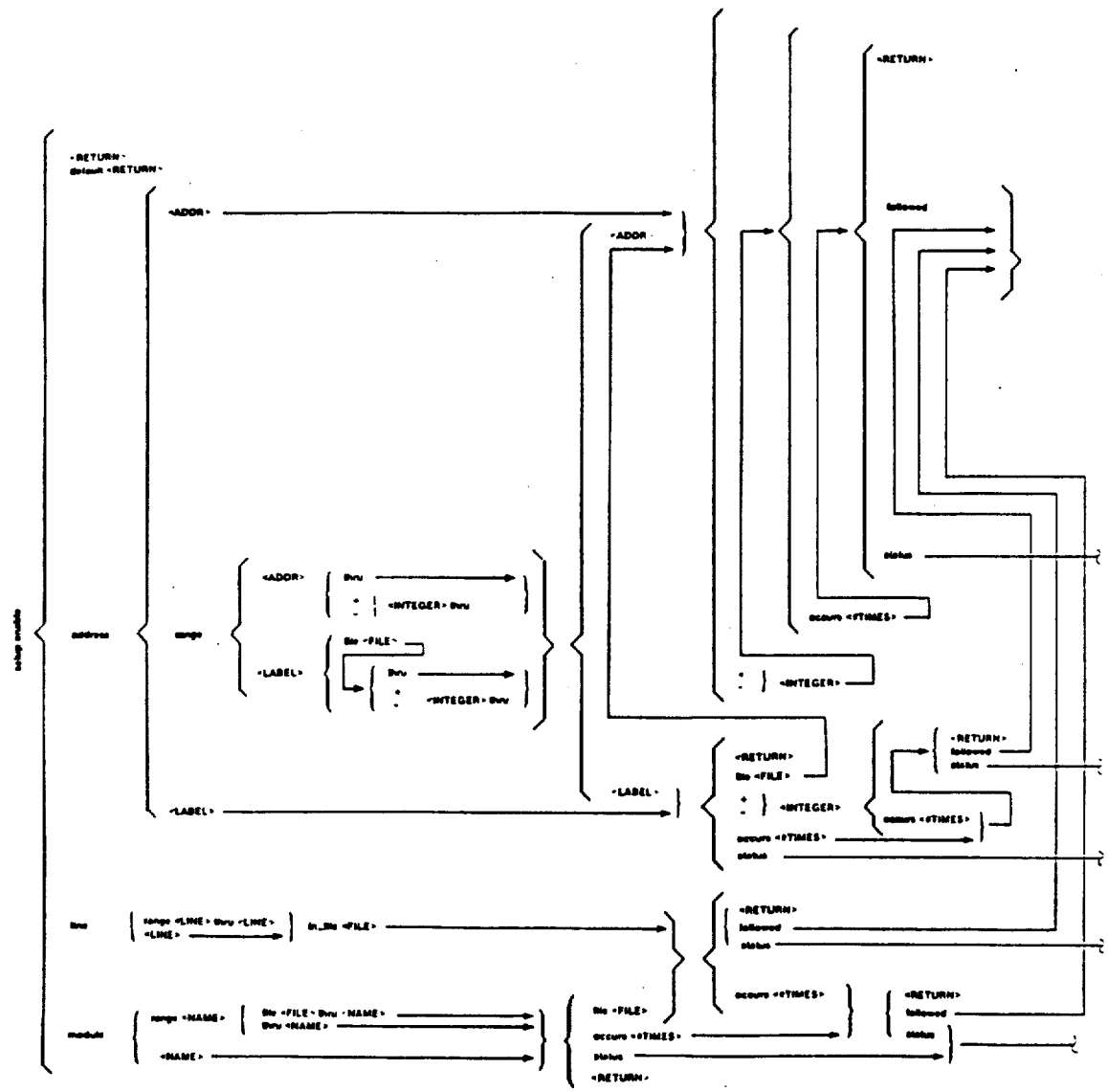
Figure A-5
Setup Enable Syntax Diagram (Sheet 1 of 3)

APPENDIX A
Page ix
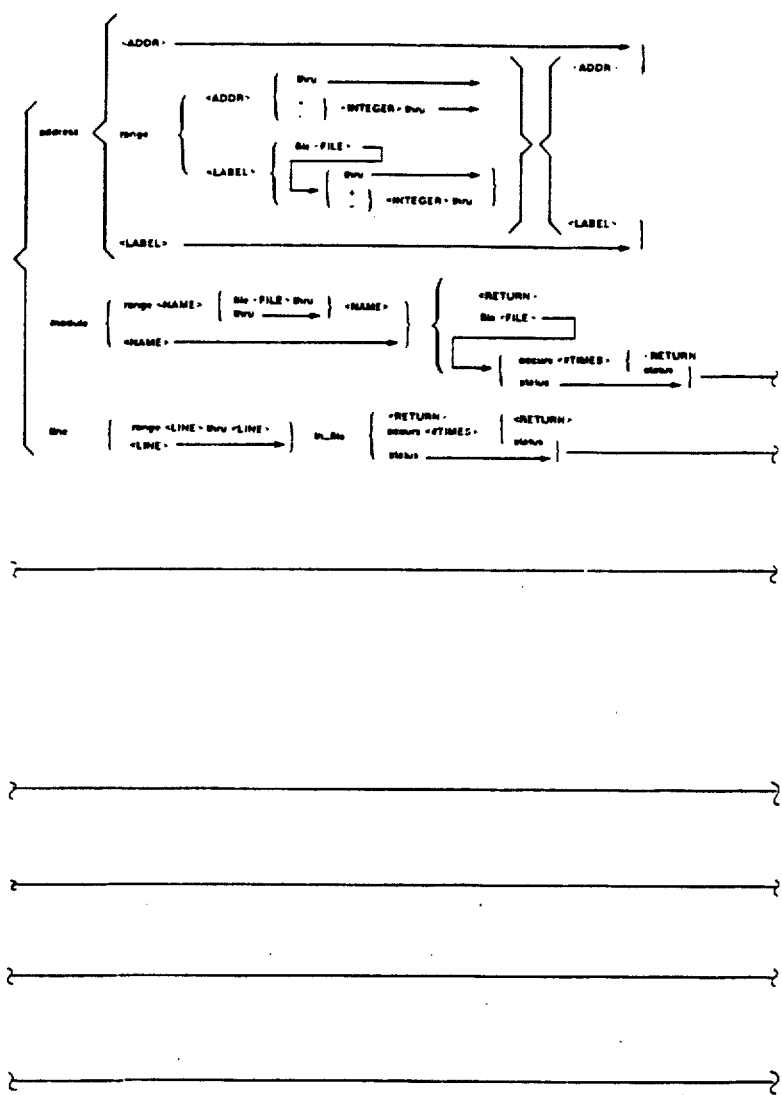
Figure A-5
Setup Enable Syntax Diagram (Sheet 2 of 3)

APPENDIX A
Page x
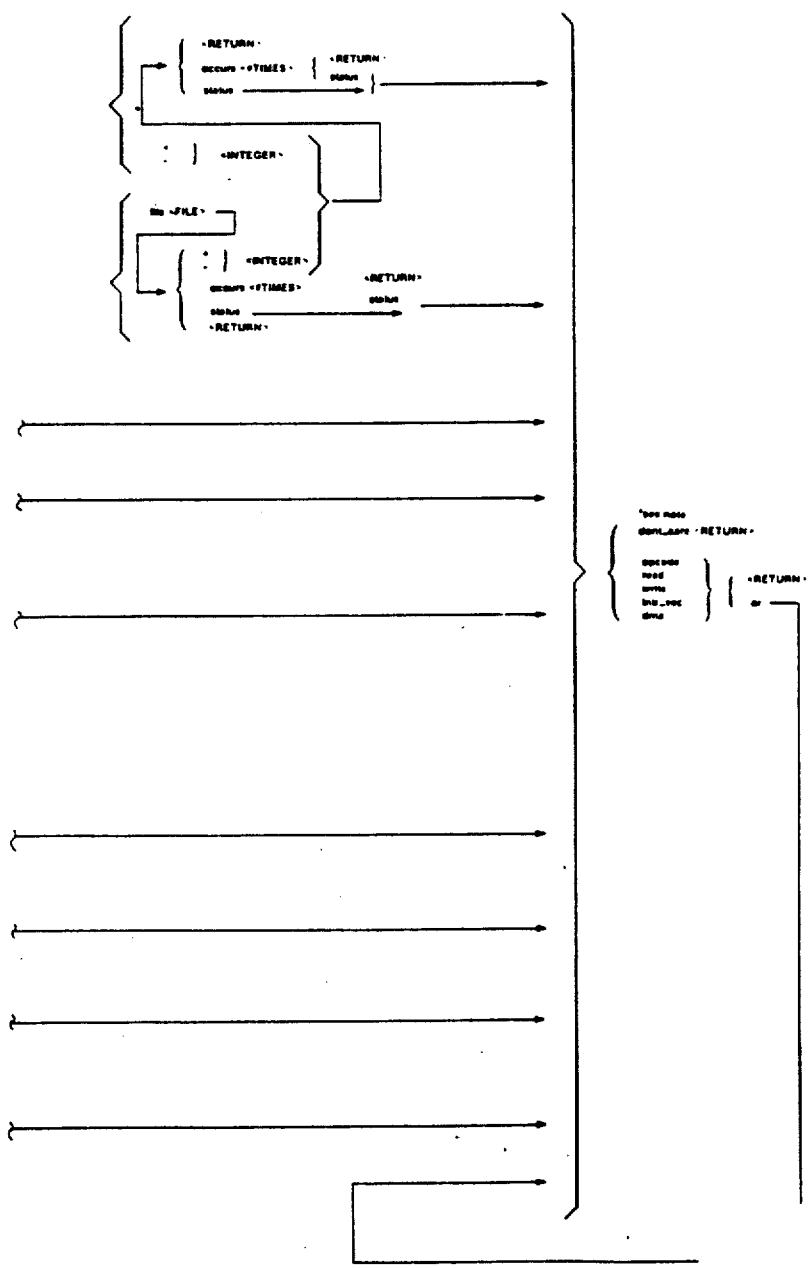
Figure A-5
Setup Enable Syntax Diagram (Sheet 3 of 3)

APPENDIX A
Page xi
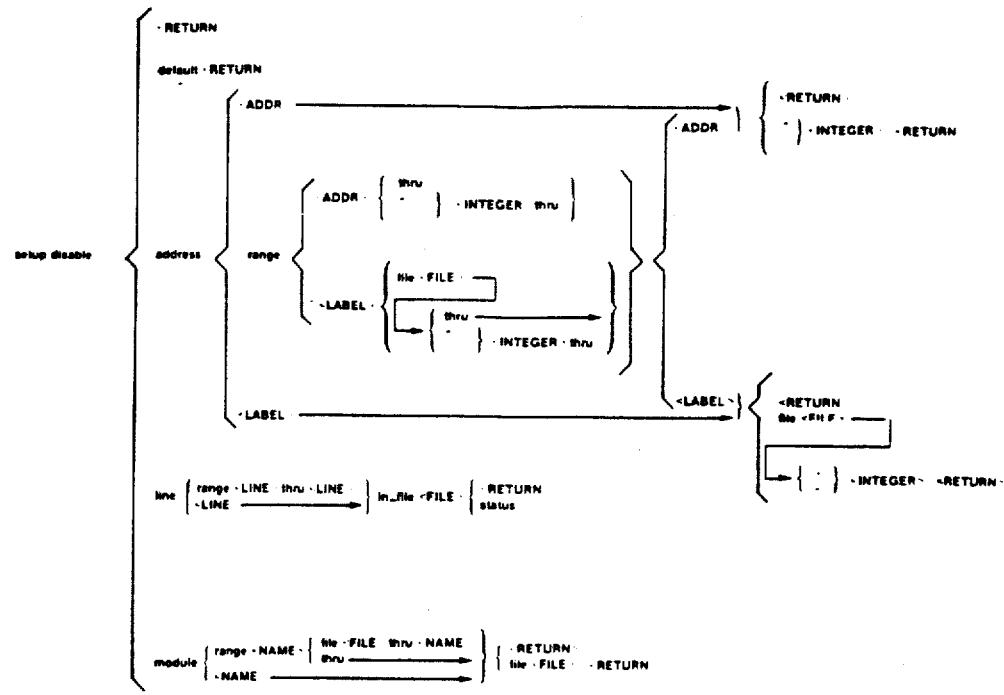
Figure A-6. Setup Disable Syntax Diagram
APPENDIX A
Page xii
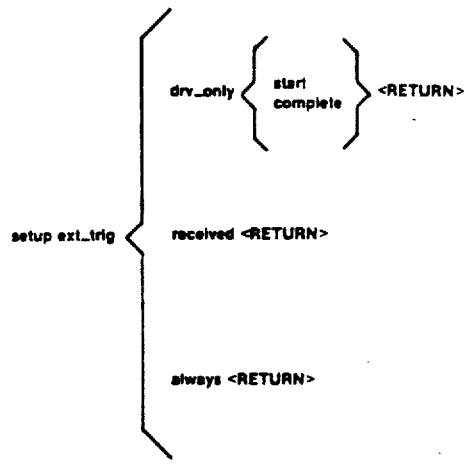
Figure A-7. Setup External Trigger Enable Syntax Diagram APPENDIX A
Page xiii
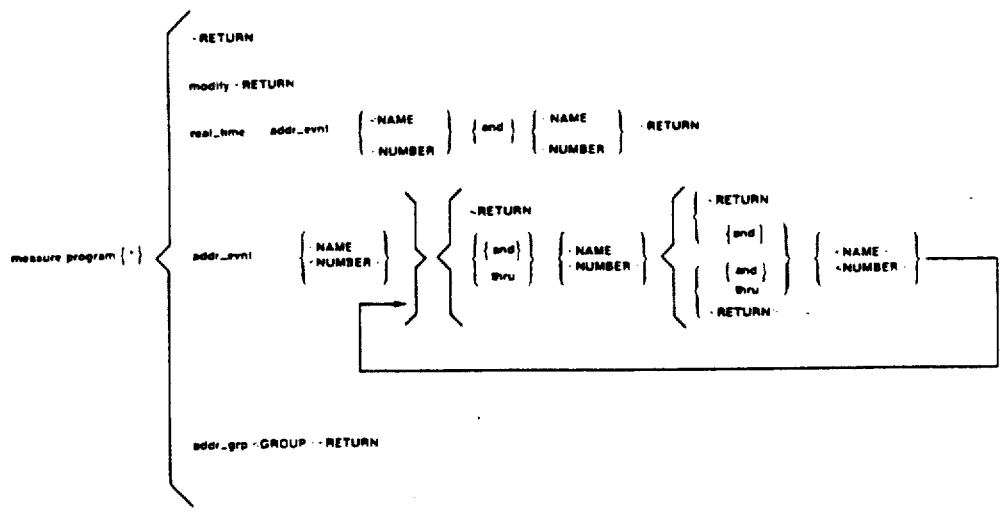
Figure A-8. Measure Program Activity Syntax Diagram
APPENDIX A
Page xiv
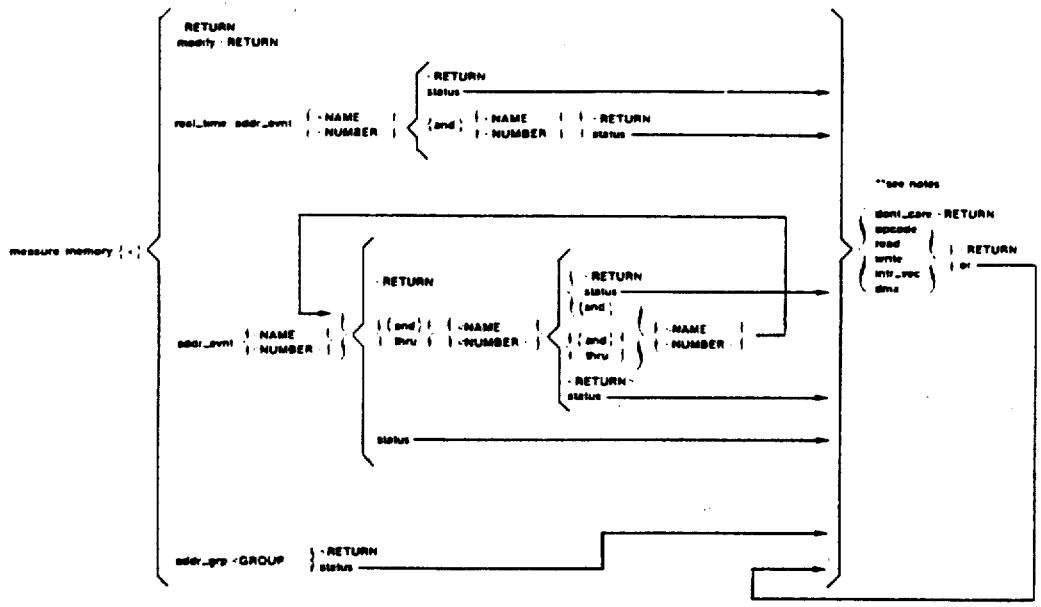
Figure A-9. Measure Memory Activity Syntax Diagram

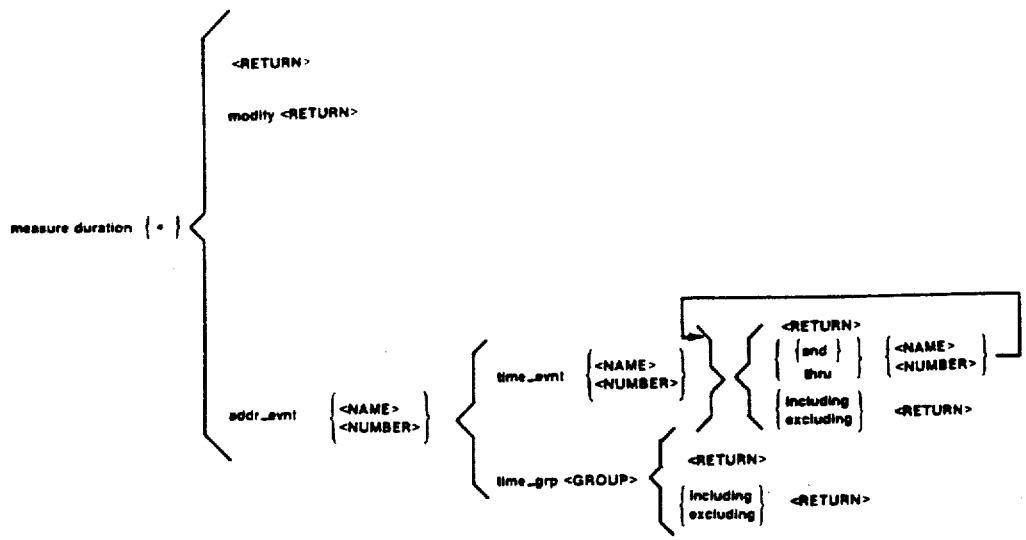

NOTE:
*denotes protection level softkeys. These softkeys are present for some microrpocessors. The softkey grammar, when present, is microprocessor dependent.

Figure A-10. Measure Module Duration Syntax Diagram

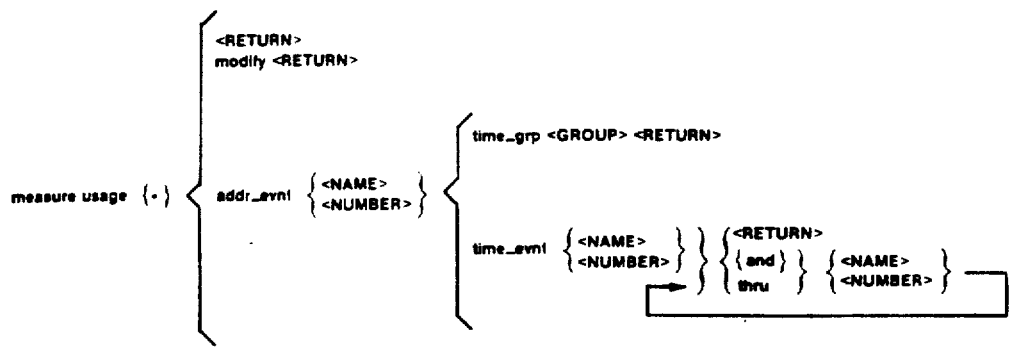

NOTE:
* denotes protection level softkeys. These softkeys are present for some microprocessors. The softkey grammar, when present, is microprocessor dependent.

Figure A-11. Measure Module Usage Syntax Diagram

APPENDIX A
Page xvii

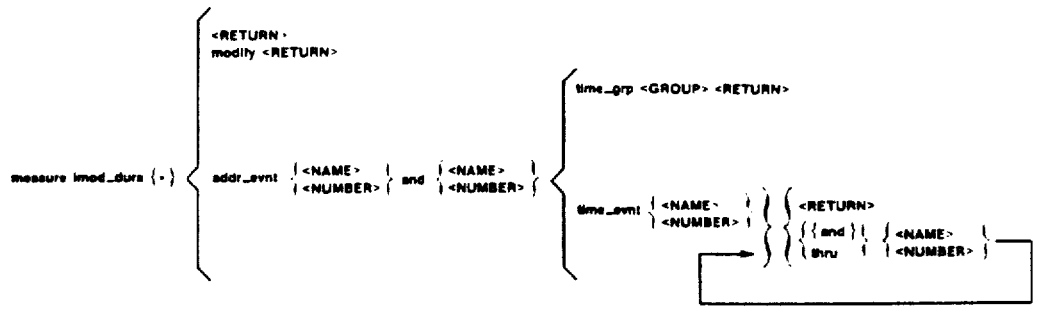

NOTE:
*denotes protection level softkeys. These softkeys are present for some microprocessors. The softkey grammar, when present, is microprocessor dependent.

Figure A-12. Measure Intermodule Duration Syntax Diagram

APPENDIX A
Page xviii

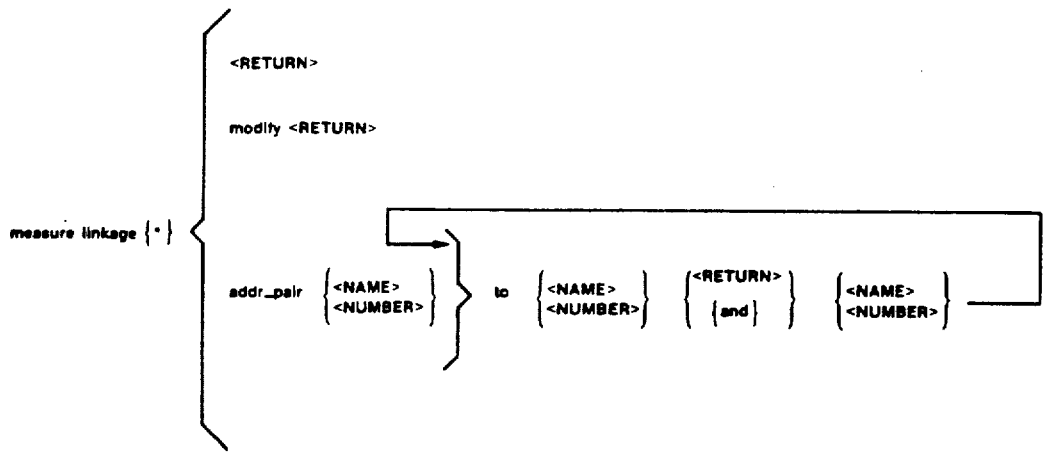

NOTE:
* denotes protection level softkeys. These softkeys are present for some microprocessors. The softkey grammar, when present, is microprocessor dependent.

Figure A-13. Measure Intermodule Linkage Syntax Diagram

APPENDIX A
Page xix
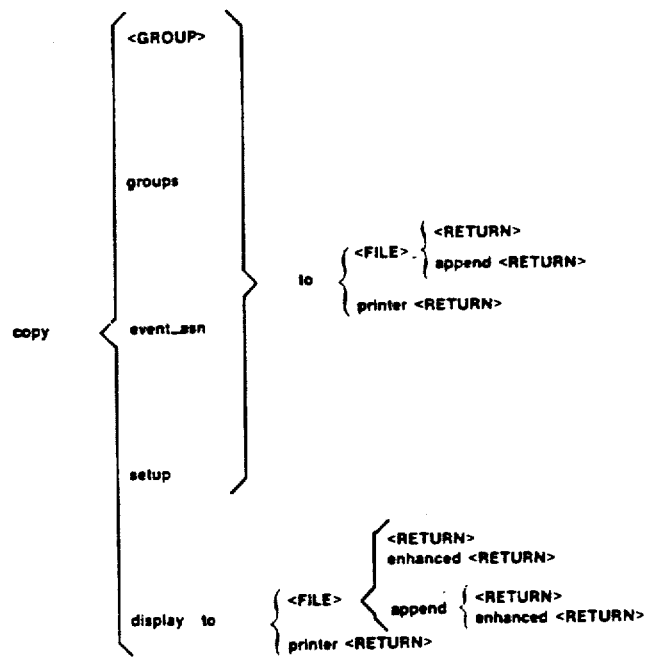
Figure A-14. Copy Syntax Diagram (Available Prior to a Measurement)
APPENDIX A
Page xx
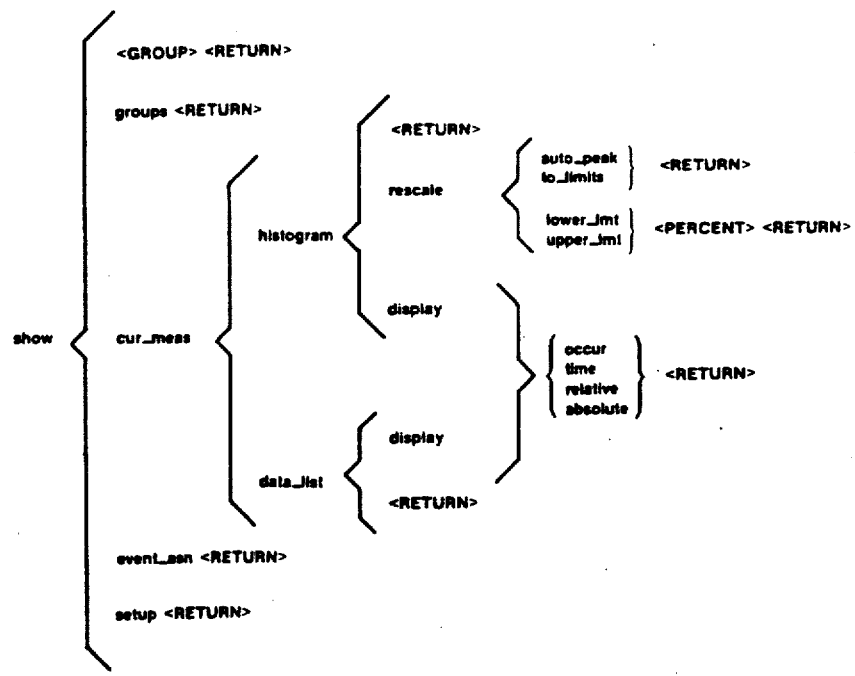
Figure A-15. Show Syntax Diagram

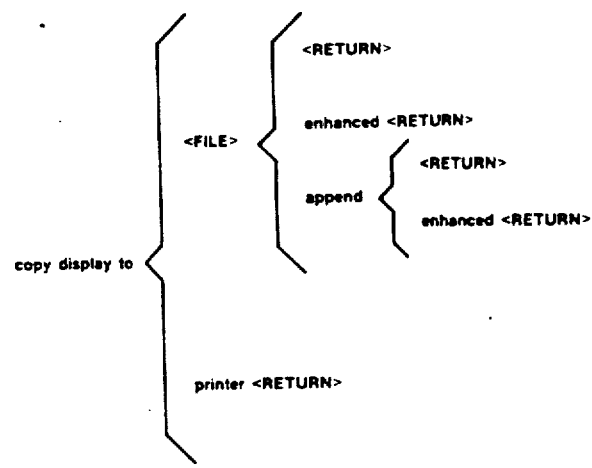
Figure A-16. Copy Syntax Diagram (Available During a Measurement)

APPENDIX B
Page i

| Softkey Prompt | Message and Meaning |
|---|---|
| <ADDR> | "Absolute address" - Any absolute address within within the limits of the processor address space. |
| <FILE> | "Absolute file name (requires link_sym file of same name)" - This file is required whenever the symbolic interface is used. |
| <FILE> | "Listing file from compiled source [:userid] [:disc#]" - The symbolic interface requires the user to specify the name of the "listing" file when entering line numbers. This file name is used to locate the appropriate line number in the associated symbol table. |
| <FILE> | "Source file containing label [:userid][:disc#]" - The symbolic interface requires the source file to be specifies so that the associated symbol table can be accessed to find the specified local symbol. |
| <FILE> | "Source file containing module (procedure) [:userid] [:disc#]" - The symbolic interface requires the source file to be specified for accessing the associated symbol table to find the specified local module. |
| <FILE> | "Valid file name" - Files will either be of the type "trace" (for configuration files) or "listing" (for copying a file). |
| <GROUP> | "Event group name" - Each event group has a name with up to eight characters associated with it. |
| <INTEGER> | "Integer value (0 to 4294967295)" - Integers are positive values over the specified range. |
| <INVALID> | "Command syntax is invalid" - The portion of the command between the beginning of the command line and the cursor contains an error in syntax. Refer to the softkeys at each point in the command to verify the syntax. |
| <LABEL> | "Label from the source file [:filename]" - The symbolic interface allows the entry of labels having up to fifteen characters. |
| <LINE> | "Line number from compiled source listing" - The symbolic interface allows the entry of line numbers as found in the compiled listing file. |

60

APPENDIX B
Page ii

| Softkey Prompt | Message and Meaning |
|---|---|
| <NAME> | "Event label" - Each event can have a name with up to fifteen characters associated with it. |
| <NAME> | "Module (procedure) name [:filename]" - The symbolic interface allows the entry of module names of up to fifteen characters. |
| <NUMBER> | "Event number" - Each event has a number associated with it. |
| <PARMS> | "Command file parameters" - The parameters passed to a command file. |
| <PERCENT> | "Percentage (0 - 100)" - An entry of a percentage between 0 and 100 is valid. |
| <PERCENT> | "Percentage (1 - 99)" - An entry of a percentage between 1 and 99 is valid. |
| <PERCENT> | "Percentage (51 - 99)" - An entry of a percentage between 51 and 99 is valid. |
| <RETURN> | "Command syntax is valid to cursor" - The portion of the command between the beginning of the command line and the cursor contains no errors in syntax and could be entered if no further options are desired. |
| <TIME> | "Time value (1us to 999us, 0.001ms to 671.0s)" - Time values are valid from 1 usec to 671 seconds. Time values entered in usec are not allowed to contain a decimal point, and those entered in msec and seconds are allowed only four decimal places; three if no decimal point is used. |
| <TIME> | "Time value (40us to 999us, 0.040ms to 671.0s)" - Time values are valid from 40 usec to 671 seconds. Time values entered in usec are not allowed to contain a decimal point, and those entered in msec and seconds are allowed only four decimal places; three if no decimal point is used. |
| <#TIMES> | "# times state described must occur (1 to 65535)" - The software performance analyzer allows the user to specify the number of times a condition within the measurement enable must occur. |

APPENDIX B
Page iii

| Softkey Prompt | Message and Meaning |
|---|---|
| <#TIMES> | "# times state described must occur (4 to 4294967295)" - The software performance analyzer allows the user to specify the event period in terms of occurrences where the definition of occurrence changes with the type of measurement selected. |
| None | "Slot # of Emulator connected to Analyzer" - The software performance analyzer requires that, if more than one emulator is present in the card cage, the user must specify the slot number of the one which is in use. This prompt message is present upon first entry to the software performance analyzer when multiple emulators are present. |

APPENDIX C
Page i

| Softkey Label | Command Line Message |
|---|---|
| *absolute* | *data_absolute* |

Used with the display command to specify that the information to be displayed for an event is compared with all activity in the entire program rather than just the events involved in the measurement.
   "display data_absolute"

*abs_file*           *absolute_file*

Used with the setup command to provide the file name of the symbol file the analyzer uses to establish the physical address of symbols entered by the user.
   "setup absolute_file FILENAME:USERID:0"

*address*            *address*

Used with measurement enable, disable, and window to indicate that the information which follows is either a physical address constant (specified in decimal, binary, hex, or octal) or a label whose address is to be "looked up" in the symbol table(s).
   "setup measurement_enable_on address 33H"
   "setup measurement_disable_on address ADDRESS"
   "setup window enable_after address ADDRESS:FILENAME:USERID:0
       disable_after address ADDRESS file FILENAME:USERID:1"

*address*            *address_event*

Used with the define command to indicate that the information which follows defines an address event (by number and/or name). The address event may consist of an address, a module, or a line range from a compiled source listing.
   "define address_event 1 named EVENT_1 as_address 1"
   "define address_event 1 named MOD_1 as_module MODULE_1"
   "define address_event 1 named EVENT_1 as_line_range 1 thru
       58 in_file FILE"

65

APPENDIX C
Page ii

| Softkey Label | Command Line Message |
|---|---|

*address*      as__address

Used with the define command to indicate that the information which follows is either a physical address constant or a label whose physical address must be obtained from the associated symbol file(s).
"define address_event as_address 4000H"
"define address_event as_address ADDRESS"

*address*     as__address__events

Used when defining a group to indicate that it is a group of address events being defined. The definition can be by event number or label, or a combination of each.
"define event_group GROUP as_address_events 1 thru 10 , LABEL_A thru LABEL_Z"

*address*     between__address__events

When measuring intermodule duration, you must specify the events between which the duration is to be measured. This command indicates that the events to follow are for that measurement.
"measure intermodule_duration between_address_events X and Y using_time_events_group TIME"

*addr__evnt*     of__address__event

Used with the "measure module_duration" and "measure_module_usage" commands to indicate the event upon which the measurement is to be made.
"measure module_duration of_address_event PROC_1 using_time_events 1, 2, 4 thru 10"

*addr__evnt*     using__address__events

Used with the "measure program_activity" and "measure memory_activity" commands to indicate that address events are to be used in the measurement.
"measure memory_activity using_address_events 1, 3, 5 thru 7, MATH_LIB"

*addr__grp*     using__address__events__group

Used with the "measure program_activity" and "measure memory_activity" commands to indicate that a previously defined group of address events is to be used in the measurement.
"measure program_activity using_address_events_group PROG_ACT"

APPENDIX C
Page iii

Softkey Label      Command Line Message

*addr_pair*      *using_address_event_pairs*

Used with the "measure intermodule_linkage" command to indicate that pairs of address events are to be used in the measurement.
"measure intermodule_linkage using_address_event_pairs
   CALCULATE to MATH_LIB"

*always*      *always*

Used with the setup trigger_enable command to specify that the IMB trigger enable signal will always be true.
"setup trigger_enable always"

*and*      *and*

Used in the intermodule duration measurement to specify the two event groups to be measured. It is also used in the setup specification to enter both the level of confidence percentage and the error percentage as parameters to terminate the measurement.
"measure intermodule_duration between_address_events 1 and
   2 using_time_events_group TIME"
"setup measurement_termination percent_confidence_level 90
   and percent_error 5"

*append*      *append*

Used with the copy command when information is to be copied to a file. Indicates that the information is to be added on to the end of the file. The absence of the append command causes the information to be copied to overwrite the existing file, causing the existing information in that file to be lost.
"copy display to FILE append"
"copy measurement_setup to FILE append"

*as_range*      *as_range*

Used when defining a time event to indicate that a time range follows.
"define time_event as_range 1 usec thru 4 seconds"

*auto_peak*      *automatically_to_peak*

Used when rescaling the histogram display to call up the automatic rescale to peak mode. This mode zooms in on the displayed information by adjusting the boundaries of the display so that the longest bar fills the screen.
"rescale automatically_to_peak"

60

65

APPENDIX C
Page iv

| Softkey Label | Command Line Message |
|---|---|
| *complete* | *on__measurement__complete* |

Used with "setup trigger_enable driven_only" command to indicate that the IMB trigger enable signal is to be driven by the software performance analyzer on measurement completion.
"setup trigger_enable driven_only on_measurement_complete"

| *confidenc* | *percent__confidence__level* |

Used with "setup measurement_termination" to specify the desired confidence level for the measurement. Valid entries are integer values from 51 through 99.
"setup measurement_termination percent_confidence_level 99"

| *configure* | *configuration* |

Used to "load_from" or "save_in" a file. The file is type "trace" and contains the entire configuration of the analyzer.
"configuration load_from SETUP:USER"

| *copy* | *copy* |

Used to copy the "event_assignments", "measurement_setup", "group_definitions", individual groups, or the display to a listing file or to the printer. The exception to this is that when a measurement is in progress, only the display can be copied to a listing file or to the printer.
"copy display to printer"

| *cur__meas* | *current__measurement* |

Used with the "show" command to select, for display, the latest measurement information, if available.
"show current_measurement histogram display data_absolute"

| *data__list* | *event__data__list* |

Used with the "display" and "show current_measurement" commands to specify that the raw statistical data is being displayed.
"display event_data_list"

| *default* | *default* |

Used with the "measurement_enable_on", "measurement_disable_on", "window", "event_period", and "measurement_termination" commands to default those conditions to (respectively) any_term, never, inactive, and 25 occurrences for duration measurements and 800 usec for activity and linkage measurements.
"setup window default"

APPENDIX C
Page v

| Softkey Label | Command Line Message |
|---|---|
| *define* | *define* |

Used to define events and groups for use in specifying measurements.
"define time_event 99 named TIME_99 as_range 1 usec thru
671 seconds"

| *disable* | *disable_after* |

Used with the "window" command to establish the disable condition.
If specified before the enable condition, the window starts in an enabled condition (see the definition for enable_after).
"setup window disable_after address 33H enable_after address
44H"

| *disable* | *measurement_disable_on* |

Used with the "setup" command to specify the disable condition for the measurement.
"setup measurement_disable_on address range 33H thru 44H"

| *display* | *display* |

Used in two ways as follows:

1. to alter the presentation of information acquired by the measurement, i.e.; display occurrences, time, data_relative, data_absolute, histogram, or event_data_list.
   "display event_data_list"

2. to request that the display be copied to a file or to the printer.
   "copy display to printer"

| *dont_care* | *dont_care* |

Used with the "status" command and the protection level commands to indicate that no qualification of the data based on the status or level of protection is required.
"setup measurement_enable_on address 23H status dont_care"

| *drv_only* | *driven_only* |

Used with "setup trigger_enable" to indicate that the IMB trigger enable signal is to be driven by the software performance analyzer on either measurement start or measurement completion.
"setup trigger_enable driven_only on_measurement_complete"

| *duration* | *module_duration* |

Used with the "measure" command to specify a module duration measurement.
"measure module_duration of_address_event 1
using_time_events_group TM_MOD_ON"

APPENDIX C
Page vi

| Softkey Label | Command Line Message |
|---|---|
| *enable* | *enable_after* |

Used with the "window" command to establish the enable condition. If specified before the disable condition, the window starts in a disabled condition (see the disable_after specification).
"setup window enable_after address 33H disable_after address 44H"

| *enable* | *measurement_enable_on* |

Used with the "setup" command to specify the enable condition for the measurement.
"setup measurement_enable_on address 33H"

| *end* | *end* |

Used to end a software performance analysis session. The current configuration is saved in a file and the software returns to the next higher level (i.e.; the measurement_system). The configuration file is named SpaIJ:HP:trace; where I = the card slot of the control board (0 to 8), and J = the cluster address of the station (0 to 7 or 8 if stand alone).
"end"

| *enhanced* | *enhanced* |

Used with the "copy display" command to indicate that each character in an enhanced video field on the display should be underscored in the output file.
"copy display to FILE enhanced"

| *error* | *percent_error* |

Used with "setup measurement_termination" to specify the desired error tolerance for the measurement. Valid entries are integer values from 1 through 99.
"setup measurement_termination percent_error 1 and percent_confidence_level 99"

| *event_asn* | *event_assignments* |

Used with the "copy" and "show" commands to indicate that the previously defined events are to be copied to either a file or a printer, or displayed on the screen.
"copy event_assignments to printer"

APPENDIX C
Page vii

| Softkey Label | Command Line Message |
|---|---|
| *excluding* | *excluding_calls* |

Used in a module duration measurement specification to indicate that calls outside the range of the event are not to be considered part of the event.
"measure module_duration of_address_event 1
    using_time_events_group TIME excluding_calls"

| *execute* | *execute* |

Begins the execution of a measurement. If interaction on the IMB is involved, all analyzers are started simultaneously.
"execute"

| *file* | *file* |

Used after entries for modules and labels to indicate that the file name of the originating source of the symbol follows. Also establishes a default file.
NOTE: A colon (:) may be used in place
    of pressing the *file* softkey.
"define address_event as_module PROC_1 file FILENAME:USERID"

| *followed* | *followed_eventually_by* |

Used when specifying a measurement enable condition to establish a 2-deep sequence.
"setup measurement_enable_on address 33H followed_eventually_by
    address 44H"

| *group* | *event_group* |

Used with the "define" command to either default, modify, or specify an event group.
"define event_group X"
"define event_group X modify"
"define event_group X as_address_events 1 thru 7"

| *groups* | *group_definitions* |

Used with the "copy" and "show" commands to indicate that the previously defined groups are to be copied to a file or printer or to be shown on the display.
"show group_definitions"
"copy group_definitions to printer"

| *halt* | *halt* |

Stops the measurement in progress. If IMB interaction is involved, all analysis modules are halted.
"halt"

APPENDIX C
Page viii

| Softkey Label | Command Line Message |
|---|---|
| *histogram* | *histogram* |

Used with the "display" and "show current_measurement" commands to specify that the accumulated data from the measurement is to be displayed in histogram form.
"display histogram"

*imod_dura*          *intermodule_duration*

Used with the "measure" command to specify an intermodule duration measurement.
"measure intermodule_duration between_address_events X and
  Y using_time_events_group TIME"

*in_file*          *in_file*

Used after entering line numbers to indicate that the file name of the originating file (a compiled Pascal or C listing file) of the line numbers follows.
"define address_event as_line_range 10 thru 100 in_file
  FILENAME:USERID"

*including*          *including_calls*

Used in a module duration measurement specification to indicate that calls outside the range of the event are to be considered part of the event.
"measure module_duration of_address_event 1
  using_time_events_group TIME including_calls"

*lin_range*          *as_line_range*

Used with the "define" command to indicate that the information to follow is a line range (specified from a compiled Pascal or C listing) whose physical addresses must be obtained from the associated symbol file(s).
"define address_event as_line_range 1 thru 10 in_file X"

*line*          *line*

Used to specify either a line or line range from a compiled Pascal or C listing when setting up a window or a measurement enable or disable condition.
"setup measurement_disable_on line range 1 thru 10 in_file
  FILENAME:USERID"

*linkage*          *intermodule_linkage*

Used with the "measure" command to specify an intermodule linkage measurement.
"measure intermodule_linkage using_address_event_pairs 1
  to 2, X to Y"

65

APPENDIX C
Page ix

| Softkey Label | Command Line Message |
|---|---|

*load_from*     load_from

Used with the "configuration" command to configure the entire software performance analyzer as specified in the file being loaded. The file being loaded is type "trace".
   "configuration load_from SETUP:USER"

*lower_lmt*     lower_limit_to

Used with the "rescale" command to alter the lower limit of the histogram display to a user-specified percentage of 0 to 100 percent.
   "rescale lower_limit_to 50"

*measure*       measure

Used to specify the type of measurement to be made.
   "measure memory_activity using_address_events_group
      ADD_EVENTS"

*memory*        memory_activity

Used with the "measure" command to specify a memory_activity measurement.
   "measure memory_activity using_address_events_group MEM_ACT"

*modify*        modify

Used when redefining groups or respecifying a measurement. Will cause the command line for the group or measurement to be recreated so that the command line can then be restructured.
   "measure memory_activity modify"

*module*        module

Used with the "setup" command to indicate that a program module or module range will follow and the software performance analyzer symbolic interface will be required to obtain the physical address range from the associated symbol file(s).
   "setup measurement_disable_on module PROC_1"

*module*        as_module

Used with the "define" command to indicate that the information to follow is a range whose physical addresses must be obtained from the associated symbol file(s).
   "define address_event as_module PROCEDURE_X file X"

60

65

APPENDIX C
Page x

| Softkey Label | Command Line Message |
|---|---|
| *msec* | *msec* |

Used to indicate that the unit for a time_event or an event_period time duration is millisecond(s).
  "setup event_period time_duration 100 msec"

| *named* | *named* |
|---|---|

Used with the "define" command to name events (up to 15 characters) to simplify recognition of certain events in the user program. Used also when using the software performance analyzer symbolic interface to rename an event whose first 15 characters match a previously defined event.
  "define time_event named MIN as_range 1 usec thru 10 usec"

| *occur* | *occurrence_count* |
|---|---|

Used wih the "setup event_period" command to specify an event_period from 4 to 4294967295 occurrences.
  "setup event_period occurrence_count 42"

| *occur* | *occurrences* |
|---|---|

Used with the "display" command to specify that the information to be displayed is to come from the occurrence counters (not the time counters).
  "display occurrences"

| *occurs* | *occurs* |
|---|---|

Used with the "setup measurement_enable_on" command to specify that the particular condition of the enable sequence must occur N (when N = 1 to 65535) times before the condition is satisfied.
  "setup measurement_enable_on address 33H occurs 100
    followed_eventually_by address 44H occurs 200"

| *or* | *or* |
|---|---|

Used as a logical combinatoric for inclusive ORing status terms or measurement termination conditions together.
  "setup measurement_termination scan_count 500 or
    total_event_count 600"

"setup measurement_disable_on address 88H status opcode
    or write_mem"

| *period* | *event_period* |
|---|---|

Used with the "setup" command to specify an event period other than the default condition, or to default an existing event period.
  "setup event_period occurrence_count 75"

APPENDIX C
Page xi

| Softkey Label | Command Line Message |
|---|---|

*printer*    printer

Used with the "copy" command to indicate that the requested information is to be listed on the system printer. This is available only if the analyzer mainframe is connected to a cluster system with a printer.
"copy display to printer"

*program*    program_activity

Used with the "measure" command to specify a program_activity measurement.
"measure program_activity using_address_events_group PROG _ACT"

*protect*    write_protect

Used with the "configuration save_in <FILE>" command to prevent the accidental modification of the file with a later "configuration save_in" command. The file is protected against writes only within the software performance analyzer software. It can still be purged, renamed, or copied into from the system monitor level software.
"configuration save_in SETUP:USER write_protect"

*range*    range

Used to indicate that a range of values is required rather than a single value.
"define address_event as_address range 33H thru 99H"

*real_time*    real_time

Used in specifying program_activity and memory_activity measurements, on a maximum of two events, as being a real-time measurement (i.e.; the specified events are not sampled, they are continuously monitored).
"measure program_activity real_time using_address_events 1, 2"

*received*    received

Used with the "setup trigger_enable" command to indicate that the software performance analyzer is to use the IMB trigger enable signal to enable its measurement.
"setup trigger_enable received"

*relative*    data_relative

Used with the "display" command to specify that the information to be displayed for an event is compared with only the events involved in the measurement. All other system activity is ignored.
"display data_relative"

60

APPENDIX C
Page xii .

| Softkey Label | Command Line Message |
|---|---|
| *repeat* | *repetitively* |

Used with the "execute" command to cause the analyzer to begin another measurement as soon as the current measurement is completed. Measurements will repeat until the "halt" command is issued.
     "execute repetitively"

*rescale*          *rescale*

Used to alter the scaling of the histogram display. Includes the auto_peak, lower_lmt, upper_lmt, and to_limits options.
     "rescale to_limits"

*restart*          *restart_measurement*

Used during a measurement execution to reinitialize all counts to zero and start the measurement over.
     "restart measurement"

*resume*          *resume_display*

Available only after the display has been suspended using the "suspend" command. Used to cause the display to resume its updating functions. No data is lost during this transaction.
     "resume_display"

*save_in*          *save_in*

Used with the "configuration" command to save the entire software performance analyzer configuration in a file. This file is of the type "trace".
     "configuration save_in SETUP:USER"

*scan_cnt*          *scan_count*

Used with the "setup measurement_termination" command to specify a desired number of scans to be performed after which the measurement becomes complete. Count is valid from 0 to 4294967295.
     "setup measurement_termination scan_count 4294967295"

*seconds*          *seconds*

Used to indicate that the unit for a time event or an event period time duration is second(s).
     "define time_event as_range 1 seconds thru 671 seconds"

APPENDIX C
Page xiii

| Softkey Label | Command Line Message |

*setup*   *measurement_setup*

Used with the "show" and "copy" commands to display, or copy to a file or printer, the parameters that have been set up that affect the measurement. These parameters consist of the following: termination conditions, event_period, window, measurement enable and disable, IMB trigger enable, and the absolute file.
"show measurement_setup"

*setup*   *setup*

Used to specify the following parameters (which may be required during a measurement session): termination conditions, event period, window, measurement enable and disable, IMB trigger enable, and the absolute file.
"setup absolute_file FILENAME:USERID"

*show*   *show*

Used to display any available information from the software performance analyzer data base. This data base consists of the following information: current measurement event data list and histogram, event assignments, group definitions and event information within the individual groups, and the measurement setup.
"show TIME_GROUP"

*start*   *on_measurement_start*

Used with the "setup trigger_enable driven_only" command to indicate that the IMB trigger enable signal is to be driven by the software performance analyzer on measurement start.
"setup trigger_enable driven_only on_measurement_start"

*stats_off*   *statistics_off*

Used to suspend the statistical calculations; resulting in a more frequent updating of the display during a measurement. When these calculations are suspended, the software performance analyzer is unable to terminate a measurement based on the percent error and/or the percent confidence level.
"statistics_off"

*stats_on*   *statistics_on*

Used to cause resumption of the statistical calculations after they have been suspended by the "statistics_off" command.
"statistics_on"

APPENDIX C
Page xiv

| Softkey Label | Command Line Message |
|---|---|

*status*      *status*

Used in the "measure memory_activity" mode and with the "setup measurement_enable_on" command. The status is set up to indicate a qualification based on a desired status condition. This status depends on the type of emulator that the software performance analyzer is connected to. The softkeys which appear on the softkey label line on the screen will be tailored to that particular emulator.
"measure memory_activity using_address_events_group MEM_ACT status opcode or read_mem"

*suspend*     *suspend_display*

Used to suspend the process of updating the display during a measurement. The process is resumed by using the "resume" command.
"suspend_display"

*terminate*     *measurement_termination*

Used with the "setup" command to establish the termination conditions for a measurement.
"setup measurement_termination scan_count 100"

*thru*     *thru*

Used with ranges to separate the minimum and maximum values of the range. Also used when specifying groups and measurements to delimit a range of events.
"define event_group TIME_GROUP as_time_events 1 thru 5"

*time*     *as_time_events*

Used to assign specific time events to a specific event group.
"define event_group TIME as_time_events 4 thru 7"

*time*     *time*

Used with the "display" command to indicate that the information desired to be measured and displayed is relative to time, not event occurrences.
"display time"

*time*     *time_duration*

Used with the "setup event_period" command to indicate an event period based on time (as opposed to occurrences) is desired for the measurement.
"setup event_period time_duration 15 msec"

APPENDIX C
Page xv

| Softkey Label | Command Line Message |
|---|---|
| *time* | *time_event* |

Used with the "define" command to indicate that the type of event being defined is a time event.
  "define time_event as_range 1 usec thru 671 seconds"

| *time* | *total_event_time* |

Used with the "setup measurement_termination" command to indicate that the total event time is to be a factor in determining when the measurement is complete. The total event time entry is valid over the range of 1 usec to 671 seconds.
  "setup measurement_termination total_event_time 45.02 msec"

| *time_evnt* | *using_time_events* |

Used with the "measure module_duration", "measure module_usage", and "measure intermodule_duration" commands to indicate that time events are to be used in the measurement.
  "measure module_duration of_address_event MATH_LIB
      using_time_events 1, 2, 4 thru 9, OVER_TIME"

| *time_grp* | *using_time_events_group* |

Used with the "measure module_duration", "measure module_usage", and "measure intermodule_duration" commands to indicate that a previously defined group of time events are to be used in the measurement.
  "measure module_usage of_address_event MATH_LIB
      using_time_events_group TIMES"

| *to* | *to* |

Used in an intermodule linkage measurement to indicate the direction of transfer is from one event "to" the other. Also used with the "copy" command to indicate where to copy the data to.
  "measure intermodule_linkage using_address_event_pairs
      CALCULATE to MATH_LIB"
  "copy display to printer"

| *to_limits* | *to_limits* |

Used with the "rescale" command to indicate that the scaling on the histogram is to be based on the data taken at the time the command was executed using the minimum and maximum values of the data to establish the scale. This effectively "zooms" in on the data.
  "rescale to_limits"

APPENDIX C
Page xvi

| Softkey Label | Command Line Message |
|---|---|

*total_cnt*     *total_event_count*

Used with the "setup measurement_termination" command to indicate that the total event count is to be a factor in determining when the measurement is complete. The total_event_count entry is valid over the range of 0 to 4294967295.
   "setup measurement_termination total_event_count 65536"

*trig_en*     *trigger_enable*

Used with the "setup" command to indicate that the IMB trigger enable signal will be involved in the measurement.
   "setup trigger_enable received"

*upper_lmt*     *upper_limit_to*

Used with the "rescale" command to alter the upper limit of the histogram display to the user-specified percentage point (0 to 100).
   "rescale upper_limit_to 75"

*usage*     *module_usage*

Used with the "measure" command to specify a module usage measurement.
   "measure module_usage of_address_event 1
      using_time_events_group T_MOD_US"

*usec*     *usec*

Used to indicate that the unit for a time event or an event period time duration is microseconds.
   "setup event_period time_duration 500 usec"

*window*     *window*

Used with the "setup" command to establish a measurement window for selectively qualifying measurement data based on the enable and disable conditions specified. The order in which they were specified will determine whether the window is initially open or closed.
   "setup window enable_after address OPEN disable_after
      address CLOSE"

I claim:

1. A method of measuring instruction fetch and non-instruction fetch memory cycles having addresses and occurring in a system under test during the execution of program modules, the method performed by an apparatus and comprising the steps of:

a. designating from among those program modules executed by the system under test exactly one program module to be tested as a program module under test;

b. clearing a counter;

c. defining the range of a range detector such that one endpoint of a range that is to be detected therewith is the entry address of the program module under test and the other endpoint of the range is the exit address of the program module under test;

d. applying addresses of memory cycles occurring during the execution of program modules to the range detector to detect which memory cycles are within the range of addresses for the program module under test;

e. detecting from status information, originating at a processor executing the program modules, which memory cycles are instruction fetches;

f. enabling the counter to respond to an increment signal, the response of the counter to the increment signal being to increment a count held therein, the enabling occurring subsequent to detection by step e of an instruction fetch that is also detected by step d to be from within the range and the counter remaining enabled until disabled by one of steps i or j below;

g. issuing an increment signal to the counter whenever an instruction is fetched from withon the range;

h. issuing an increment signal to the counter whenever there occurs a non-instruction fetch memory cycle at an address outside the range, thereby causing the count in the counter to reflect non-instruction fetch activity occurring within the execution of the module under test;

i. disabling the response of the counter to the increment signal, the disabling occurring subsequent to detection by steps d and e of an instruction fetch that is outside the range, and the counter remaining disabled until subsequently enabled by step f;

j. disabling the response of the counter to the increment signal, the disabling occurring subsequent to detection of an instruction fetch from the exit address of the program module under test, and the counter remaining disabled until subsequently enabled by step f; and k. transferring the value of the counter to a data processing mechanism at the end of a selected length of time.

2. A method as in claim 1 wherein step a further comprises the step of pseudo randomly designating the program module under test from an electronically stored list of program modules that are executable by the system under test.

3. A method as in claim 1 wherein steps a through k are performed for a plurality of program modules and further comprising the step of displaying, subsequent to the performances for a plurality of program modules, indicia indicative of the activity of each program module.

* * * * *